(12) United States Patent
Hazari et al.

(10) Patent No.: US 12,233,402 B2
(45) Date of Patent: Feb. 25, 2025

(54) CROSS-COUPLING REACTION CATALYSTS, AND METHODS OF MAKING AND USING SAME

(71) Applicant: YALE UNIVERSITY, New Haven, CT (US)

(72) Inventors: Nilay Hazari, New Haven, CT (US); Patrick Melvin, New Haven, CT (US)

(73) Assignee: Yale University, New Haven, CT (US)

( * ) Notice: Subject to any disclaimer, the term of this patent is extended or adjusted under 35 U.S.C. 154(b) by 1465 days.

(21) Appl. No.: 16/496,601

(22) PCT Filed: Mar. 27, 2018

(86) PCT No.: PCT/US2018/024572
§ 371 (c)(1),
(2) Date: Sep. 23, 2019

(87) PCT Pub. No.: WO2018/183328
PCT Pub. Date: Oct. 4, 2018

(65) Prior Publication Data
US 2020/0016582 A1   Jan. 16, 2020

Related U.S. Application Data

(60) Provisional application No. 62/477,849, filed on Mar. 28, 2017.

(51) Int. Cl.
| | | |
|---|---|---|
| C07F 15/00 | (2006.01) | |
| B01J 31/22 | (2006.01) | |
| B01J 31/24 | (2006.01) | |
| B01J 37/03 | (2006.01) | |
| C07F 15/04 | (2006.01) | |

(52) U.S. Cl.
CPC ....... *B01J 31/2295* (2013.01); *B01J 31/2404* (2013.01); *B01J 37/031* (2013.01); *C07F 15/006* (2013.01); *B01J 2531/824* (2013.01); *B01J 2531/828* (2013.01); *B01J 2531/847* (2013.01)

(58) Field of Classification Search
CPC .... C07F 15/006; C07F 15/0086; C07F 15/04; B01J 31/2295; B01J 31/2404; B01J 2531/824
See application file for complete search history.

(56) References Cited

U.S. PATENT DOCUMENTS

| | | |
|---|---|---|
| 3,054,815 A | 9/1962 | Schroll |
| 3,063,974 A | 11/1962 | Pruett et al. |
| 3,064,020 A | 11/1962 | Randolph |
| 2009/0093657 A1 | 4/2009 | Buchanan et al. |
| 2009/0264608 A1 | 10/2009 | Wakatsuki et al. |

FOREIGN PATENT DOCUMENTS

| | | |
|---|---|---|
| CN | 101486735 A | 7/2009 |
| CN | 101486736 A | 7/2009 |
| WO | 2006064814 A1 | 6/2006 |
| WO | 2015189555 A1 | 12/2015 |
| WO | 2016005760 A1 | 1/2016 |
| WO | 2016057600 A1 | 4/2016 |

OTHER PUBLICATIONS

Extended European Search Report for European Patent Application No. 18775030.2 issued Nov. 10, 2020.
International Search Report and Written Opinion for PCT International Application No. PCT/US2018/024572 issued May 17, 2018.
Chemical Abstract Service, RN: 1605321-50-3 CA network version—STN database, May 2014.
Alias , et al., "Synthesis and reactivity studies of Pd(II) complexes of the bulky CH(SiMe3)2 group. X ray structure of the indenyl derivative (η-Ind)Pd[CH(SiMe3)2](PMe3)", Journal of Organometallic Chemistry 577(2):, Apr. 1999 , 316-322.
Andriotis , et al., "Contrasting bonding behaviors of 3d transition metal atoms with graphite and C60", Phys. Rev. B: Condensed Matter and Materials Physics 62 (15), Oct. 2000, 9867.
Bai , et al., "Mono- and Bimetallic (NacNac)Ni Cyclopentadienyl Complexes", Organometallics 25 (25), 2006, 5870-5878.
Beck , et al., "Dinuclear Ni(I)—Ni(I) Complexes with Syn-Facial Bridging Ligands from Ni(I) Precursors or Ni(II)/Ni(0) Comproportionation", Organometallics 2 (10), 2013, 2944-2951.
Bercaw , et al., "C—H bond activation by [{(diimine)Pd(mu-OH)}2]2+ dimers: mechanism-guided catalytic improvement", Angew Chem Int Ed Engl. 47(51), 208, 9941-9943.
Bielinski , et al., "Synthesis, Properties, and Reactivity of Palladium and Nickel NHC Complexes Supported by Combinations of Allyl, Cyclopentadienyl, and Indenyl Ligands", Organometallics 32 (15), 2013, 4025-4037.
Bruno , et al., "Buchwald Ligands and Precatalysts", Strem Chemicals, Inc., 2015, 1-61.
Carassiti , "A modern development of the concept of coordination. III. Complex nickelocyanides", Gazzetta Chimica Italiana 85, 1955, 944-955 (Abstract only).
Castonguay , et al., "Chloro[n5-1-(dimethylaminoethyl_indenyl]-(triphenylphosphine)nickel(II) diethyl ether hemisolvate", Acta Crystallographica, Section E: Structure Reports Online, vol. 61 (8), 2005, m1512-m1513.
Chalkley , et al., "Synthesis, Electronic Structure, and Reactivity of Palladium(I) Dimers with Bridging Allyl, Cyclopentadienyl, and Indenyl Ligands", Organometallics 32(15), Jul. 2013, 4223-4238.
Chekkal , et al., "Structural and spin diversity of M(indenyl)2 transition-metal complexes: a DFT investigation", New Journal of Chemistry 37(8), 2013, 2293-2302 (abstract only).
Chen , et al., "Phenylsilane dehydrocoupling and addition to styrene catalyzed b (R-indenyl)ni(phosphine)(methyl) complexes", Canadian Journal of Chemistry, 2009, 87, 2009, 280-287.

(Continued)

*Primary Examiner* — Sikarl A Witherspoon
(74) *Attorney, Agent, or Firm* — Saul Ewing LLP; Kathryn Doyle; Domingos J. Silva

(57) ABSTRACT

The present invention provides novel transition-metal precatalysts that are useful in preparing active coupling catalysts. In certain embodiments, the precatalysts of the invention are air-stable and moisture-stable. The present invention further provides methods of making and using the precatalysts of the invention.

21 Claims, 5 Drawing Sheets

(56) References Cited

OTHER PUBLICATIONS

Chesnokov, et al., "Solvent-free Buchwald-Hartwig amination with low palladium loadings", Mendeleev Communications 27(6), Nov. 2017, 618-620.

Dai, et al., "Synthesis and Properties of NHC-Supported Palladium(I) Dimers with Bridging Allyl, Cyclopentadienyl, and Indenyl Ligands", Organometallics 32(18), 2013, 5114-5127.

Dalla Via, et al., "Platinum(II) chloride indenyl complexes: electrochemical and biological evaluation", J Biol Inorg Chem. 16(5), Jun. 2011, 695-713.

Dardir, et al., "Rapidly Activating Pd-Precatalyst for Suzuki-Miyaura and Buchwald-Hartwig Couplings of Aryl Esters", J Org Chem. 83(1), Jan. 2018, 469-477.

Denninger, et al., "Transition metal complexes. VIII. An unusual rearrangement of a butadienyl ligand via cyclometallation", Journal of Organometallic Chemistry 459 (1-2), Oct. 1993, 349-357.

Fiato, et al., "Intramolecular Cyclization of π-1-Chloro-3-phenylallylpalladium(II) Complexes. A Novel Route to Stable Indenyl Complexes of Palladium(II)", J.C.S. Chem. Comm, 1975, 869-871.

Fontaine, et al., "Hydrosilylation of alkenes and ketones catalyzed by nickel(II) idenyl complexes", Canadian Journal of Chemistry, 81, 2003, 1299-1306.

Fontaine, et al., "Me2AlCH2PMe2: a new, bifunctional cocatalyst for the Ni(II)-catalyzed oligomerization of PhSiH3", J. Am. Chem. Soc. 126(28), 2004, 8786-8794.

Fontaine, et al., "Solid State Structures and Phosphine Exchange Reactions of (1-Me-Indenyl)(PR3)Ni—Cl", Organometallics 20(24), 2001, 5156-5161 (Abstract Only).

Friesen, "Product subclass 2: palladium-allyl complexes", Science of Synthesis, vol. 1: Category 1, Organometallics, 2002, 113-264 (partial reference).

Gareau, et al., "Idenyl-Nickel Complexes Bearing a Pendant, Hemilabile Olefin Ligand: Preparation, Characterization, and Catalytic Activities", Organometallics 24(16), 2005, 4003-4013.

Groux, et al., "Aminoalkyl-Substituted Indenyl-Nickel Compounds: Tuning Reactivities as a Function of the Pendant, Hemilabile Moiety", Organometallics 22(15), 2003, 3124-3133.

Groux, et al., "Structure and Reactivity of the Cationic Nickel Compound [(η3:η1-Ind(CH2)2NMe2)Ni(PPh3)][BPh4]", Organometallics 20(17), 2001, 3811-3817.

Guseva, et al., "Reactions of Rh2(OOCCH3)4 with various Pfunctionalized calix(4)resorcinarenes", Vestnik Kazanskogo Tekhnologicheskogo Universiteta 16(11), 2013, 7-14 (abstract only).

Hansson, et al., "Preparation of allylic acetates from simple alkenes by palladium(II)-catalyzed acetoxylation", J. Org. Chem. 55(3), 1990, 975-984.

Hintermann, et al., "Interactions of Cationic Palladium(II)- and Platinum(II)-η-Allyl Complexes with Fluoride: Is Asymmetric Allylic Fluorination a Viable Reaction?", European Journal of Inorganic Chemistry 2006(7), Apr. 2006, 1397-1412 (Abstract Only).

Holland, et al., "Monomeric Cyclopentadienylnickel Methoxo and Amido Complexes: Synthesis, Characterization, Reactivity, and Use for Exploring the Relationship between H-X and M-X Bond Energies", J. Am. Chem. Soc. 119 (52), Dec. 1997, 12800-12814.

Jimenez Tenorio, et al., "Structural characterisation of cationic methylallyl, methylindenyl and pentamethylcyclopentadienyl nickel complexes containing the bulky phosphine 1,2-bis(diisopropylphosphino)ethane", J Chem Soc., Dalton Trans., 2001, 653-657.

Jimenez-Tenorio, et al., "Cationic Nickel Complexes Containing Bulky Phosphine Ligands: Catalyst Precursors for Styrene Polymerization", Organometallics 23(13), 2004, 3139-3146.

Karlsson, et al., "Mechanism of the palladium-catalyzed carbohydroxylation of allene-substituted conjugated dienes: rationalization of the recently observed nucleophilic attack by water on a (pi-allyl)palladium intermediate", Chemistry 14(30), 2008, 9175-9180.

Kinzel, et al., "A new palladium precatalyst allows for the fast Suzuki-Miyaura coupling reactions of unstable polyfluorophenyl and 2-heteroaryl boronic acids", J. Am. Chem. Soc. 132(40), 2010, 14073-14075.

Köhler, et al., "Carbon-13 NMR spectra of indene .pi.-complexes for the determination of ligand hapto properties", Chemische Berichte 107(2), Feb. 1974, 570-574 (abstract only).

Koziol, et al., "New ionic fluorenylnickel complexes: Synthesis and solid state structure", Journal of Organometallic Chemistry 767, Sep. 2014, 22-26.

Lei, et al., "Suzuki-Miyaura cross-coupling of amides and esters at room temperature: correlation with barriers to rotation around C—N and C—O bonds", Chem Sci. 8(9), Sep. 2017, 6525-6530.

Lin, et al., "An Improved Preparation of Polymer-Type η3-Allylpalladiumchlorides", Journal of the Chinese Chemical Society (Taipei, Taiwan) 36(1), Feb. 1989, 35-40 (abstract only).

Marion, et al., "Modified (NHC)Pd(allyl)Cl (NHC=N-Heterocyclic Carbene) Complexes for Room-Temperature Suzuki-Miyaura and Buchwald-Hartwig Reactions", J. Am. Chem. Soc. 128(12), 2006, 4101-4111.

Melvin, et al., "Design of a Versatile and Improved Precatalyst Scaffold for Palladium-Catalyzed Cross-Coupling: (η3-1-tBu-indenyl)2(μ-Cl)2Pd2", ACS Catal. 5(6), May 2015, 3680-3688.

Melvin, et al., "Pd-Catalyzed Suzuki-Miyaura and Hiyama-Denmark Couplings of Aryl Sulfamates", Org Lett. 18(22), Nov. 2016, 5784-5787.

Melvin, et al., "Understanding Precatalyst Activation in Cross-Coupling Reactions: Alcohol Facilitated Reduction from Pd(II) to Pd(0) in Precatalysts of the Type (η3-allyl)Pd(L)(Cl) and (η3-indenyl)Pd(L)(Cl)", ACS Catal. 5(9), 2015, 5596-5606.

Monot, et al., "A case study of proton shuttling in palladium catalysis", Chem Sci. 7(3), Mar. 2016, 2179-2187.

Nakasuji, et al., "Coordination of polycyclic conjugated hydrocarbons to palladium. Syntheses, characterization, and molecular orbital study of Pd(.eta.3-phenalenyl)(acac) and [Pd(.eta.3-indenyl)Cl]2", Organometallics 3(8), 1984, 1257-1260.

Oblad, et al., "Oxidation of Organometallic Platinum and Palladium Complexes Obtained from C—H Activation", Organometallics 29(4), Jan. 2010, 789-794.

Ritleng, et al., "Half-sandwich NHC-nickel(II) complexes as precatalysts for the fast Suzuki coupling of aryl halides: a comparative study", Dalton Transactions, 2010, 39, 2010, 8153-8160.

Schwab, et al., "Parahydrogen conversion in solution. I. Parahydrogen conversion by metallorganic compounds", Zeitschrift fuer Physikalische Chemie (Muenchen, Germany) 3, 1955, 341-354 (abstract only).

Sen, et al., "Reactions of electrophilic transition metal cations with olefins and small ring compounds. Rearrangements and polymerizations", Journal of Organometallic Chemistry 358(1-3), Dec. 1988, 567-588.

Sui-Seng, et al., "Catalytic reactivities of indenyl-nickel, indenyl-palladium, and PCsp3P-nickel complexes", Topics in Catalysis 37(2-4), Apr. 2006, 81-90.

Sui-Seng, et al., "New palladium(II)-(eta(3/5)- or eta1-indenyl) and dipalladium(I)-(mu,eta3-indenyl) complexes", J Am Chem Soc. 128(19), 2006, 6508-6519.

Sui-Seng, et al., "New Routes to eta1-and (eta3-eta5)-Idenylpalladium Complexes: Synthesis, Characterization, and Reactivities", Organometallics 23(6), 2004, 1236-1246.

Sui-Seng, et al., "Synthesis and Reactivities of Neutral and Cationic Idenyl-Palladium Complexes", Organometallics 25(3), 2006, 571-579.

Sui-Seng, et al., "trans-Bis(benzylamine)dichloropalladium(II)", Acta Crystallographica, Section E: Structure Reports Online 59(10), 2003, m957-m958.

Sui-Seng, et al., "trans-Di-chloro-bis(3,4-lutidine-κN)-palladium(II)", Acta Crystallographica Section E: Structure Reports Online 59(11), 2003, m1065-m1066.

Sun, et al., "Idenylnickel(II) Halides for the Polymerization of Styrene in the Presence of NaBPh4/PPh3", Chinese Journal of Chemistry 24, 2006, 409-413.

Sun, et al., "Indenylnickel(II) N-Heterocyclic Carbene Complexes: Synthesis via Indene Elimination and Catalytic Activity for Ethylene Dimerization", Organometallics 24(2), 2005, 331-334.

(56) References Cited

OTHER PUBLICATIONS

Turner, et al., "Facile resolution of constrained geometry indenyl-phenoxide ligation", Chem Commun (Camb). (9), May 2003, 1034-1035 (abstract only).

Vicente, et al., "Palladium-Assisted Formation of Carbon-Carbon Bonds. 9.† Synthesis of (2-Alkenylaryl)- and Indenylpalladium Complexes", Organometallics 19 (26), 2000, 5597-5607.

Viciu, et al., "Well-Defined, Air-Stable (NHC)Pd(Allyl)Cl (NHC= N-Heterocyclic Carbene) Catalysts for the Arylation of Ketones", Org. Lett. 4 (23), 2002, 4053-4056 (abstract only).

Vollmerhaus, et al., "Preparation and Characterization of Cationic Nickel Idenyl Complexes [(1-methylindenyl)NiLL']+", Organometallics 16(22), 1997, 4762-4764.

Wang, et al., "Endohedral metallofullerene Sc3NC@C84: a theoretical prediction", Phys Chem Chem Phys. 14(43), Nov. 2012, 15099-15105 (Abstract only).

Wang, et al., "Preparation, Characterization, and reactivities of thienyl nickel complexes bearing idenyl ligands", Journal of Organometallic Chemistry 660, 2002, 98-107.

Williams, et al., "C—H bond activation by air-stable [(diimine)M(II)(mu2-OH)]2(2+) dimers (M=Pd, Pt)", J Am Chem Soc. 130(8), Feb. 2008, 2418-2419.

Williams, et al., "Reactions of Indene and Indoles with Platinum Methyl Cations: Indene C—H Activation, Indole π vs. Nitrogen Lone-Pair Coordination", Organometallics. 26(2), 2007, 281-287.

Wu, et al., "Nickel(I) monomers and dimers with cyclopentadienyl and indenyl ligands", Chemistry 20(18), Apr. 2014, 5327-5337.

Xie, et al., "Synthesis and Structure of indenylnickel(II) chlorides bearing free N-heterocyclic carbine ligands and their catalysis for styrene polymerization", Polyhedron 28(13), 2009, 2585-2590.

Zhou, et al., "Synthesis and X-ray crystal structures of acenaphthenequinone-based α-diimine palladium complexes and a novel V-shape tripalladium cluster", Zeitschrift fur Anorganische und Allgemeine Chemie 634(9), 2008, 1517-1521.

FIG. 1

*i) Buchwald-Hartwig Reaction*

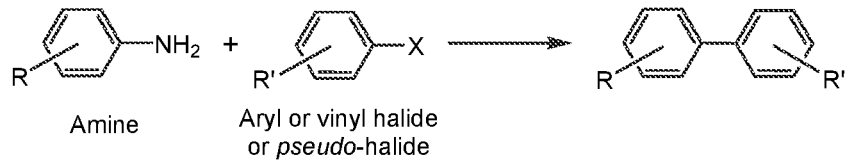

Amine / Aryl or vinyl halide or *pseudo*-halide

*ii) Negishi Reaction*

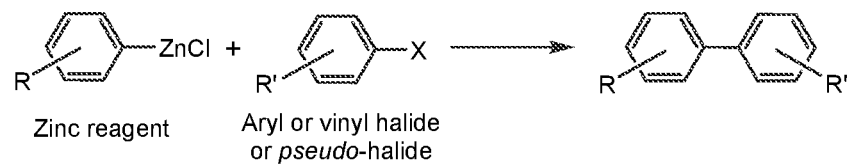

Zinc reagent / Aryl or vinyl halide or *pseudo*-halide

*iii) Kumada Reaction*

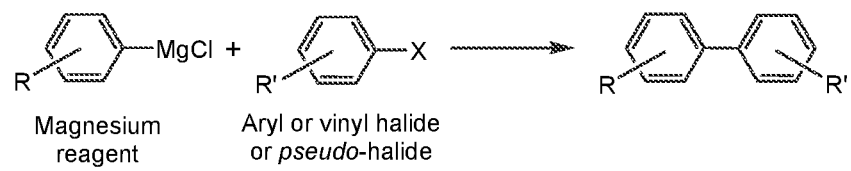

Magnesium reagent / Aryl or vinyl halide or *pseudo*-halide

*iv) Stille Reaction*

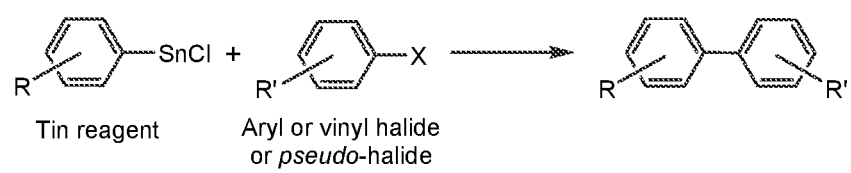

Tin reagent / Aryl or vinyl halide or *pseudo*-halide

*v) α-Arylation*

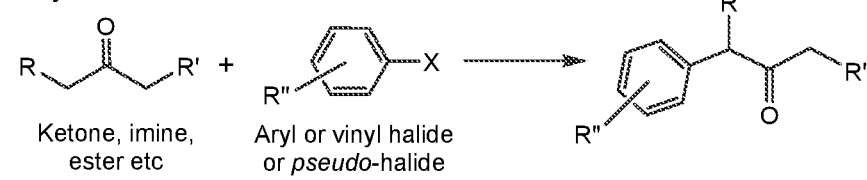

Ketone, imine, ester etc / Aryl or vinyl halide or *pseudo*-halide

*vi) C-S or C-O Bond Formation*

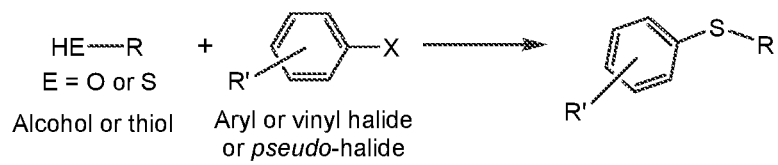

E = O or S

Alcohol or thiol / Aryl or vinyl halide or *pseudo*-halide

*vii) Anaerobic alcohol oxidation*

*viii) Suzuki-Miyaura Reaction*

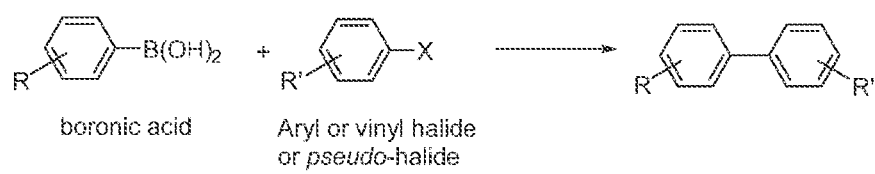

boronic acid / Aryl or vinyl halide or *pseudo*-halide

FIG. 5
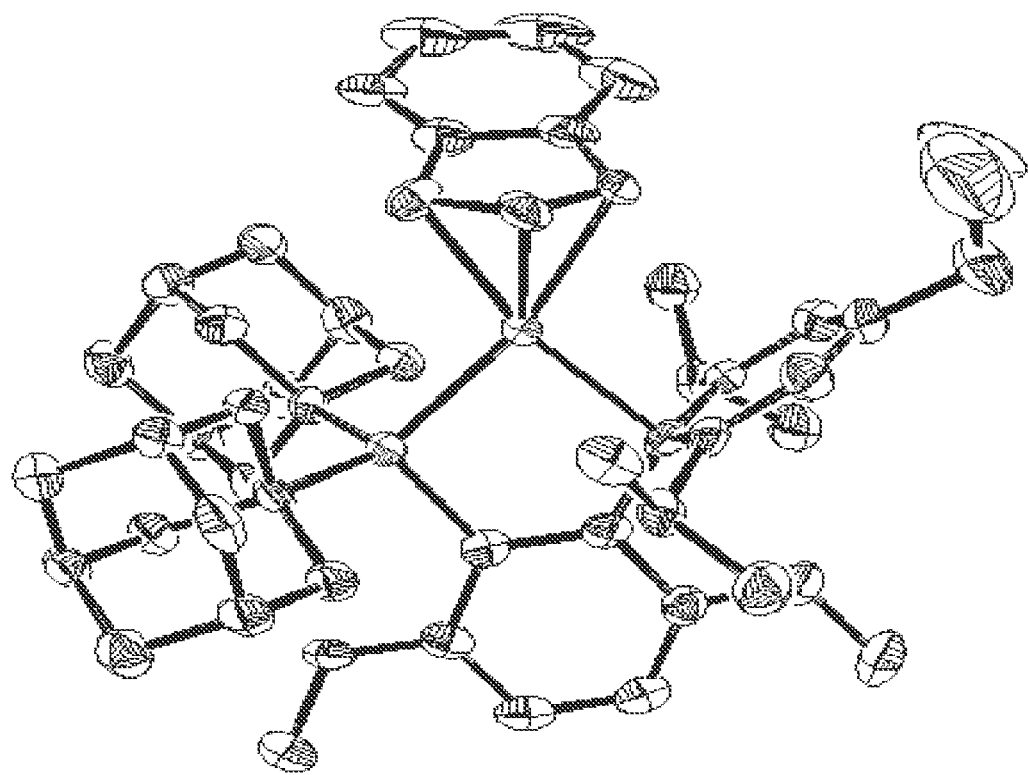
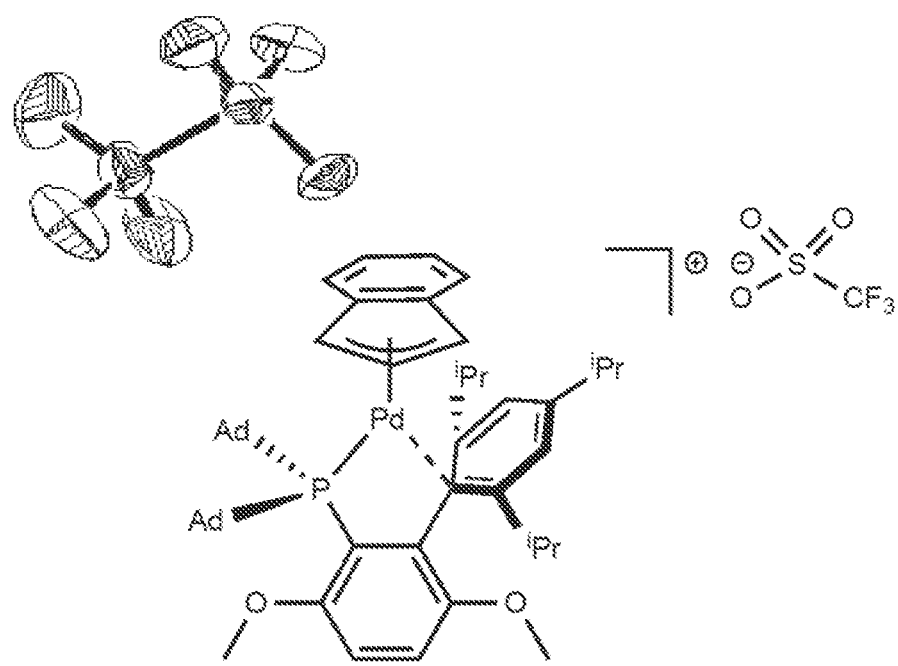

CROSS-COUPLING REACTION CATALYSTS, AND METHODS OF MAKING AND USING SAME

CROSS-REFERENCE TO RELATED APPLICATIONS

The present application is a 35 U.S.C. § 371 national phase application from, and claims priority to, International Application No. PCT/US2018/024572, filed Mar. 27, 2018, and published under PCT Article 21 (2) in English, which claims priority under 35 U.S.C. § 119 (e) to U.S. Provisional Application No. 62/477,849, filed Mar. 28, 2017, all of which applications are incorporated herein by reference in their entireties.

STATEMENT REGARDING FEDERALLY SPONSORED RESEARCH

This invention was made with government support under 1122492 awarded by National Science Foundation and GM120162 awarded by National Institutes of Health. The government has certain rights in the invention.

BACKGROUND OF THE INVENTION

Transition metal-catalyzed cross-coupling has found applications in various areas of chemistry, such as total synthesis, materials science, and bioorganic chemistry. Cross-coupling is indeed one of the most powerful and general synthetic methods available today. In particular, the active pharmaceutical ingredients of drugs such as losartan [(2-butyl-4-chloro-1-{[2'-(1H-tetrazol-5-yl)biphenyl-4-yl]methyl}-1H-imidazol-5-yl)methanol], which is used to treat high blood pressure, and atazanavir [methyl N-[(1S)-1-{[(2S,3S)-3-hydroxy-4-[(2S)-2-[(methoxy carbonyl)amino]-3,3-dimethyl-N'-{[4-(pyridin-2-yl)phenyl]methyl}butanehydrazido]-1-phenylbutan-2-yl]carbamoyl}-2,2-dimethylpropyl]carbamate], which is used to treat HIV, are synthesized using cross-coupling reactions.

The most effective cross-coupling catalysts utilize Pd and feature sterically demanding, electron-rich phosphine or N-heterocyclic carbene (NHC) ancillary ligands. The active species in catalysis, which is commonly monoligated Pd(0), is often generated through the addition of excess ligand to a Pd(0) source. However, the specialized ligands utilized in most cross-coupling reactions are often as expensive as the Pd(0) source itself, and the use of excess ligand is not economically feasible.

There is thus a need in the art for novel precatalysts, which can be efficiently converted to an active catalytic species. The present invention addresses and meets this need.

BRIEF SUMMARY OF THE INVENTION

The invention provides a precatalyst of formula (I), or a salt or solvate thereof:

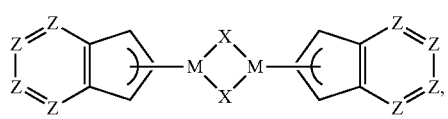

(I)

wherein in (I):
each occurrence of M is independently a transition metal;
a non-coordinating or weekly coordinating ligand, such as, but not limited to, triflate or trifluoromethanesulfonate (or another perfluoroalkanesulfonate, such as, but not limited to, pentafluoroethanesulfonate, heptafluoropropanesulfonate, and/or nonafluorobutanesulfonate), halide, mesylate, tetrafluoroborate, hexafluorophosphate, hexafluoroantimonate, tetraphenylborate, acetate, trifluoroacetate, acetylacetonate (acac), triflimide, or tosylate;
each occurrence of Z is independently CH, CR or N, with the proviso that 0-2 Z groups are N; or the Z groups at the 5- and 6-positions are null and the Z groups at the 4- and 7-positions are independently R; and
each occurrence of R is independently selected from the group consisting of $C_1$-$C_6$ alkyl, substituted $C_1$-$C_6$ alkyl, $C_3$-$C_8$ cycloalkyl, substituted $C_3$-$C_8$ cycloalkyl, $C_2$-$C_6$ alkenyl, substituted $C_2$-$C_6$ alkenyl, $C_2$-$C_6$ alkynyl, substituted $C_2$-$C_6$ alkynyl, phenyl, substituted phenyl, phenylalkyl, substituted phenylalkyl, aryl, substituted aryl, aryl-$C_1$-$C_6$ alkyl, substituted aryl-$C_1$-$C_6$ alkyl, heteroaryl-$C_1$-$C_6$ alkyl, substituted heteroaryl-$C_1$-$C_6$ alkyl, heteroaryl, and substituted heteroaryl.

The invention further provides a precatalyst of formula (II), or a salt or solvate thereof:

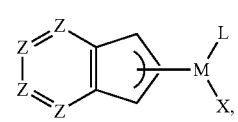

(II)

wherein in (II):
M is a transition metal;
X is a non-coordinating or weekly coordinating ligand, such as, but not limited to, triflate or trifluoromethanesulfonate (or another perfluoroalkanesulfonate, such as, but not limited to, pentafluoroethanesulfonate, heptafluoropropanesulfonate, and/or nonafluorobutanesulfonate), halide, mesylate, tetrafluoroborate, hexafluorophosphate, hexafluoroantimonate, tetraphenylborate, acetate, trifluoroacetate, acetylacetonate (acac), triflimide, or tosylate;
each occurrence of Z is independently CH, CR or N, with the proviso that 0-2 Z groups are N; or the Z groups at the 5- and 6-positions are null and the Z groups at the 4- and 7-positions are independently R;
each occurrence of R is independently selected from the group consisting of $C_1$-$C_6$ alkyl, substituted $C_1$-$C_6$ alkyl, $C_3$-$C_8$ cycloalkyl, substituted $C_3$-$C_8$ cycloalkyl, $C_2$-$C_6$ alkenyl, substituted $C_2$-$C_6$ alkenyl, $C_2$-$C_6$ alkynyl, substituted $C_2$-$C_6$ alkynyl, phenyl, substituted phenyl, phenylalkyl, substituted phenylalkyl, aryl, substituted aryl, aryl-$C_1$-$C_6$ alkyl, substituted aryl-$C_1$-$C_6$ alkyl, heteroaryl-$C_1$-$C_6$ alkyl, substituted heteroaryl-$C_1$-$C_6$ alkyl, heteroaryl, and substituted heteroaryl; and
L is a monodentate or bidentate ligand, with the proviso that L is not a monodentate phosphine ligand of formula PR*$_3$, wherein each occurrence of R* is independently selected from the group consisting of phenyl, cyclohexyl, methyl, and methoxy.

In certain embodiments, the precatalyst is a compound of formula (IIA), or a salt or solvate thereof:

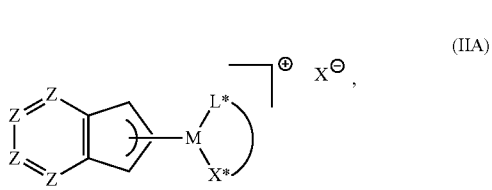

wherein in (IIA):
L is a bidentate ligand represented as

wherein each L* is independently a monodentate ligand group, and X does not coordinate to M.

In certain embodiments, each occurrence of M in (I) is independently selected from the group consisting of Pd, Ni, and Pt. In other embodiments, in (II) M is selected from the group consisting of Pd, Ni, and Pt. In other embodiments, the two occurrences of M in (I) are identical. In yet other embodiments, the two occurrences of M in (I) are Pd. In yet other embodiments, in (II) M is Pd.

In certain embodiments, the two ligands comprising 5-membered rings are identical.

In certain embodiments, each occurrence of Z is independently selected from the group consisting of CH and CR In certain embodiments, each occurrence of X in (I) is the same.

In certain embodiments, each occurrence of X is independently selected from the group consisting of a perfluoroalkanesulfonate, halide, mesylate, tetrafluoroborate, hexafluorophosphate, hexafluoroantimonate, tetraphenylborate, acetate, trifluoroacetate, acetylacetonate, triflimide, and tosylate. In yet other embodiments, each occurrence of X is independently selected from the group consisting of triflate, pentafluoroethanesulfonate, heptafluoropropanesulfonate, and nonafluorobutanesulfonate.

In certain embodiments, each occurrence of X in (I) is a perfluoroalkanesulfonate. In other embodiments, each occurrence of X in (I) is triflate.

In certain embodiments, X in (II) is a perfluoroalkanesulfonate. In other embodiments, X in (II) is triflate.

In certain embodiments, L is selected from the group consisting of 1,3-bis(2,6-diisopropyl phenyl)-1,3-dihydro-2H-imidazol-2-ylidene and 1,3-bis(2,6-bis-(diphenylmethyl)-4-methoxyphenyl)imidazol-2-ylidene. In other embodiments, L is a bidentate phosphine ligand. In yet other embodiments, L is at least one selected from the group consisting of AmPhos (di-t-butylphosphino-4-dimethylaminobenzene), DavePhos (2-dicyclohexylphosphino-2'-(N,N-dimethylamino)biphenyl), $^{tBu}$DavePhos (2-Di-tert-butylphosphino-2'-(N,N-dimethylamino)biphenyl), QPhos (1,2,3,4,5-pentaphenyl-1'-(di-tert-butylphosphino)ferrocene), RuPhos (2-dicyclohexylphosphino-2',6'-diisopropoxybiphenyl), SPhos (2-dicyclohexylphosphino-2',6'-dimethoxybiphenyl), XPhos (2-dicyclohexyl phosphino-2',4',6'-triisopropylbiphenyl), $^{tBu}$XPhos (2-Di-tert-butylphosphino-2',4',6'-triisopropylbiphenyl), $^{Me4tBu}$XPhos (2-Di-tert-butylphosphino-3,4,5,6-tetramethyl-2',4',6'-triisopropyl-1,1'-biphenyl), BrettPhos (2-(Dicyclohexylphosphino)-3,6-dimethoxy-2',4',6'-triisopropyl-1,1'-biphenyl), $^{tBu}$BrettPhos (2-(Di-tert-butylphosphino)-2',4',6'-triisopropyl-3,6-dimethoxy-1,1'-biphenyl), $^{Ad}$BrettPhos (2-(Diadamantylphosphino)-2',4',6'-triisopropyl-3,6-dimethoxy-1,1'-biphenyl), Me-DalPhos (2-(Di-1-adamantylphosphino) phenylpiperidine), Mor-DalPhos (Di(1-adamantyl)-2-morpholinophenylphosphine), Di(1-adamantyl)-1-piperidinyl-phenylphosphine, RockPhos (2-Di(tert-butyl) phosphino-2',4',6'-triisopropyl-3-methoxy-6-methylbiphenyl), AlPhos (Di-1-adamantyl(4"-butyl-2",3",5",6"-tetrafluoro-2',4',6'-triisopropyl-2-methoxy-meta-terphenyl)phosphine), PipDalPhos (1-(2-(di((3S,5S,7S)-adamantan-1-yl)phosphanyl)phenyl)piperidine), TrippyPhos (1-[2-[Bis(tert-butyl)phosphino]phenyl]-3,5-diphenyl-1H-pyrazole), BippyPhos (5-(Di-tert-butylphosphino)-1',3',5'-triphenyl-1'H-[1,4']bipyrazole), DPPF (1,1'-bis(diphenylphosphino)ferrocene), XantPhos (4,5-bis(diphenylphosphino)-9,9-dimethylxanthene), NiXantPhos (4,6-bis(diphenylphosphanyl)-10H-phenoxazine), dppe (1,2-bis(diphenylphosphino)ethane), dppm (1,1-bis(diphenylphosphino)methane), dppp (1,3-bis(diphenylphosphino) propane), dppb (1,4-bis(diphenylphosphino)butane), BINAP (2,2'-bis(diphenylphosphino)-1,1'-binaphthyl), DPEPhos (bis[(2-diphenylphosphino) phenyl] ether), 1,2-bis(dichlorophosphino) ethane, and dcpe (1,2-bis(dicyclohexylphosphino)-ethane). In yet other embodiments, L is at least one selected from the group consisting of an N-heterocyclic carbine (NHC), triphenylphosphine, tri(o-tolyl) phosphine, tricyclohexylphosphine, tri(t-butyl)phosphine, trimethylphosphine, trimethoxyphosphine, $PAd_3$ (Ad=admantyl), trinaphthlphosphine, tri(pentafluorophenyl) phosphine, Diphenyl-2-pyridylphosphine, tri(2-furyl)phosphine, tri(n-octyl)phosphine, dimethylphenylphosphine, AmPhos (di-t-butylphosphino-4-dimethylaminobenzene), DavePhos (2-dicyclohexylphosphino-2'-(N,N-dimethylamino)biphenyl), $^{tBu}$DavePhos (2-Di-tert-butylphosphino-2'-(N,N-dimethylamino)biphenyl), QPhos (1,2,3,4,5-pentaphenyl-1'-(di-tert-butylphosphino)ferrocene), RuPhos (2-dicyclohexylphosphino-2',6'-diisopropoxy biphenyl), SPhos (2-dicyclohexylphosphino-2',6'-dimethoxybiphenyl), XPhos (2-dicyclohexylphosphino-2',4',6'-triisopropylbiphenyl), $^{tBu}$XPhos (2-Di-tert-butylphosphino-2',4',6'-triisopropylbiphenyl), $^{Me4tBu}$XPhos (2-Di-tert-butylphosphino-3,4,5,6-tetramethyl-2',4',6'-triisopropyl-1,1'-biphenyl), BrettPhos (2-(Dicyclohexylphosphino)3,6-dimethoxy-2',4',6'-triisopropyl-1,1'-biphenyl), $^{tBu}$BrettPhos (2-(Di-tert-butylphosphino)-2',4',6'-triisopropyl-3,6-dimethoxy-1,1'-biphenyl), $^{Ad}$BrettPhos (2-(Diadamantylphosphino)-2',4',6'-triisopropyl-3,6-dimethoxy-1,1'-biphenyl), Me-DalPhos (2-(Di-1-adamantylphosphino) phenylpiperidine), Mor-DalPhos (Di (1-adamantyl)-2-morpholinophenylphosphine), Di(1-adamantyl)-1-piperidinyl-phenylphosphine, RockPhos (2-Di(tert-butyl)phosphino-2',4',6'-triisopropyl-3-methoxy-6-methylbiphenyl), AlPhos (Di-1-adamantyl(4"-butyl-2",3",5",6"-tetrafluoro-2',4',6'-triisopropyl-2-methoxy-meta-terphenyl)phosphine), PipDalPhos (1-(2-(di((3S,5S,7S)-adamantan-1-yl)phosphanyl)phenyl)piperidine), TrippyPhos (1-[2-[Bis(tert-butyl)phosphino]phenyl]-3,5-diphenyl-1H-pyrazole), BippyPhos (5-(Di-tert-butylphosphino)-1',3',5'-triphenyl-1'H-[1,4']bipyrazole), DPPF (1,1'-bis(diphenylphosphino)ferrocene), XantPhos (4,5-bis(diphenylphosphino)-9,9-dimethylxanthene), NiXantPhos (4,6-bis(diphenylphosphanyl)-10H-phenoxazine), dppe (1,2-bis(diphenylphosphino)ethane), dppm (1,1-bis(diphenylphosphino)methane), dppp (1,3-bis(diphenylphosphino) propane), dppb (1,4-bis(diphenylphosphino)butane), BINAP (2,2'-bis(diphenylphosphino)-1,1'-binaphthyl), DPEPhos (bis[(2-diphenylphosphino) phenyl] ether), 1,2-bis(dichlorophosphino) ethane, and dcpe (1,2-bis(dicyclohexylphosphino)-ethane).

The invention further provides a method of preparing the precatalyst of formula (II) of the invention. In certain embodiments, the method comprises contacting a mixed alkaline/transition metal or alkaline-earth/transition metal salt with the ligand

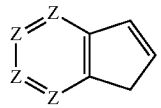

in the presence of a base in an organic solvent to form a reaction mixture. In other embodiments, if the mixed alkaline/transition metal or alkaline-earth/transition metal salt does not comprise a perfluoroalkanesulfonate salt, the reaction mixture is further contacted with a perfluoroalkanesulfonate salt. In yet other embodiments, the base comprises sodium carbonate. In yet other embodiments, the organic solvent comprises methanol. In yet other embodiments, the precatalyst precipitates from the reaction mixture. In yet other embodiments, the mixed salt comprises [E]MX'$_2$, wherein [E] is Na$_2$, K$_2$, Ca or Mg; and X' is Cl or perfluoroalkanesulfonate. In yet other embodiments, the mixed salt comprises Na$_2$PdCl$_2$. In yet other embodiments, the mixed alkaline/transition metal salt or a mixed alkaline-earth/transition metal salt is prepared by contacting MX'$_2$ with an alkaline or alkaline-earth salt in solution.

The invention further provides a method of preparing the precatalyst of formula (I) of the invention. In certain embodiments, the method comprises contacting the catalyst of formula (I) with a ligand L.

The invention further provides a method of promoting a reaction between a first reagent and a second reagent. In certain embodiments, the method comprises contacting the first reagent and the second reagent in the presence of at least one selected from the group consisting of (a) a ligand, and a precatalyst of formula (I), or a salt or solvate thereof; and (b) a precatalyst of formula (II), or a salt or solvate thereof.

In certain embodiments, the first reagent is an aromatic or heteroaromatic boronic acid or ester, and the second reagent is an aromatic or heteroaromatic halide, tosylate, triflate, mesylate, sulfamate, or carbamate.

In certain embodiments, the first reagent is an aromatic or heteroaromatic amine, and the second reagent is an aromatic, heteroaromatic, or vinylic halide, tosylate, triflate, mesylate, sulfamate, or carbamate.

In certain embodiments, the first reagent is an aromatic or heteroaromatic zinc halide, and the second reagent is an aromatic, heteroaromatic, or vinylic halide, tosylate, triflate, mesylate, sulfamate, or carbamate.

In certain embodiments, the first reagent is an aromatic or heteroaromatic magnesium halide, and the second reagent is an aromatic, heteroaromatic, or vinylic halide, tosylate, triflate, mesylate, sulfamate, or carbamate.

In certain embodiments, the first reagent is an aromatic or heteroaromatic tin halide, and the second reagent is an aromatic, heteroaromatic, or vinylic halide, tosylate, triflate, mesylate, sulfamate, or carbamate.

In certain embodiments, the first reagent is a ketone, aldehyde, imine, amide, or ester, and the second reagent is an aromatic, heteroaromatic, or vinylic halide, tosylate, triflate, mesylate, sulfamate, or carbamate.

In certain embodiments, the first reagent is an alcohol or thiol, and the second reagent is an aromatic, heteroaromatic, or vinylic halide, tosylate, mesylate, sulfamate, or carbamate.

In certain embodiments, the first reagent is an aromatic or heteroaromatic silanol, siloxane or silane, and the second reagent is an aromatic, heteroaromatic, or vinylic halide, tosylate, triflate, mesylate, sulfamate, or carbamate.

The invention further provides a method of promoting anaerobic oxidation of a primary or secondary alcohol. In certain embodiments, the method comprises contacting the primary or secondary alcohol with at least one selected from the group consisting of: (a) a ligand and a precatalyst of formula (I), or a salt or solvate thereof; and (b) a precatalyst of formula (II), or a salt or solvate thereof.

BRIEF DESCRIPTION OF THE DRAWINGS

For the purpose of illustrating the invention, certain embodiments of the invention are depicted in the drawings. However, the invention is not limited to the precise arrangements and instrumentalities of the embodiments depicted in the drawings.

FIG. 1 is a set of exemplary reaction schemes that can be performed using precatalysts of the invention.

FIG. 5 is an exemplary ORTEP of the ($\eta^3$-Indenyl)Pd (AdBrettPhos)(Cl) precatalyst. Ellipsoids shown at 30% probability. Hydrogen atoms are omitted for clarity.

DETAILED DESCRIPTION OF THE INVENTION

Figure 2:
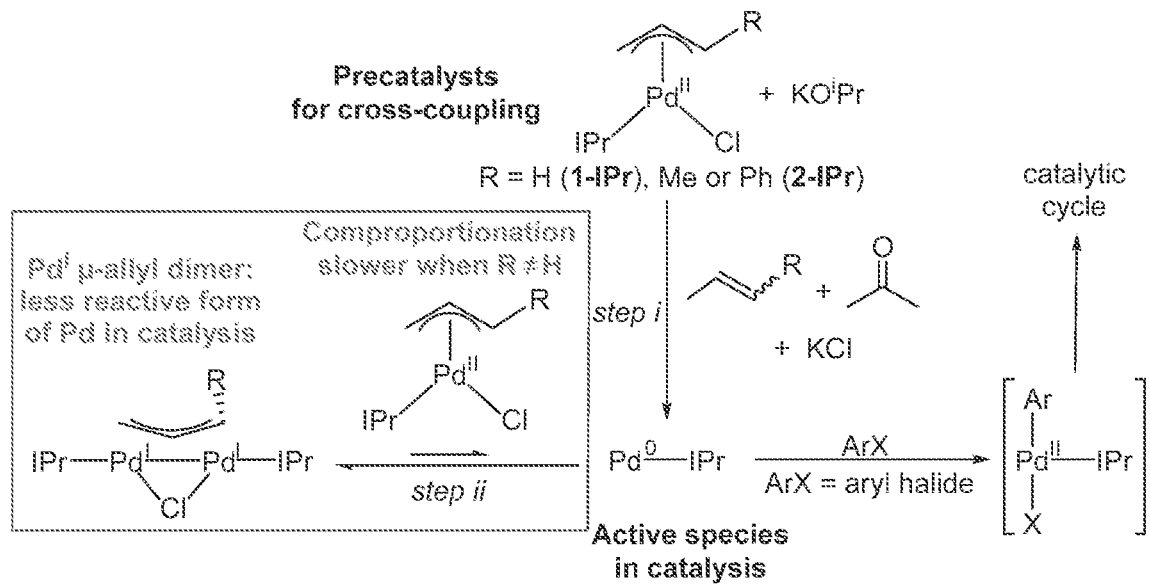
FIG. 2 is a scheme illustrating a non-limiting pathway for activation of precatalysts of the type ($\eta^3$-allyl)Pd(IPr)(Cl) with KO$^i$Pr (generated from KO$^t$Bu in $^i$PrOH). Both the rate of activation to Pd(0) (step i) and comproportionation to Pd(I) (step ii) affect catalytic activity.
Figure 3:
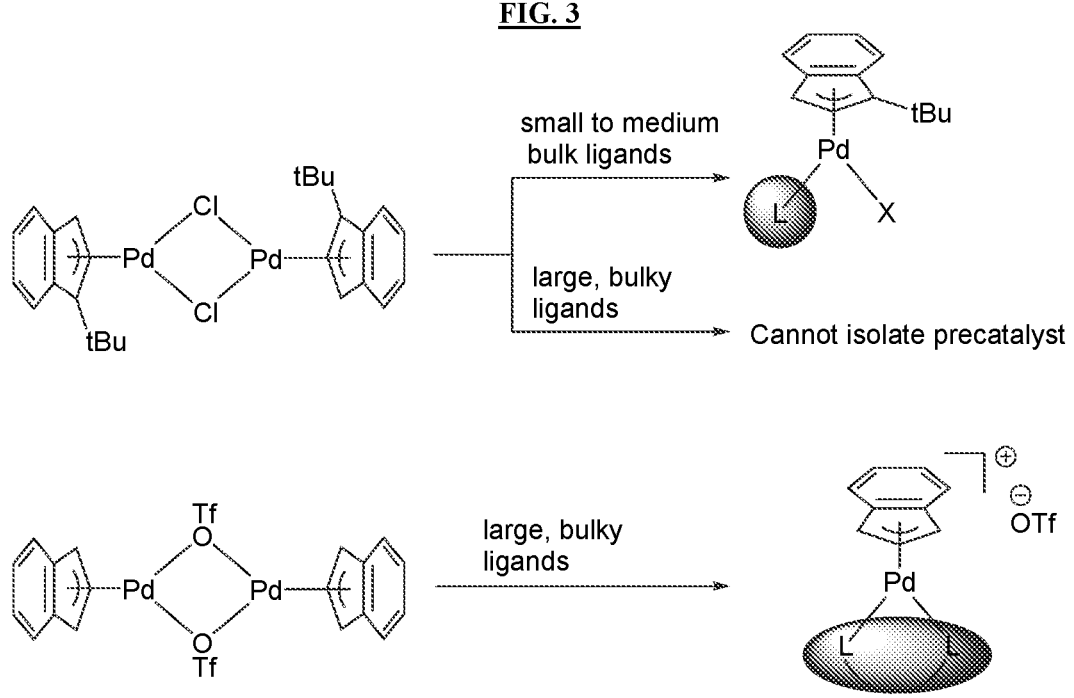
FIG. 3 is a scheme illustrating issues relating to ($\eta^3$-1-$^t$Bu-Indenyl)Pd(L)(Cl) precatalysts described in the prior art and non-limiting characteristics of the unsubstituted indenyl-triflate precatalysts of the invention.

The present invention relates in part to the unexpected discovery of novel transition-metal precatalysts that are useful in preparing active coupling catalysts. In certain embodiments, the precatalysts of the invention are air-stable and moisture-stable. In other embodiments, the precatalysts of the invention comprise a dimeric precatalyst of formula (I). In yet other embodiments, the precatalysts of the invention comprise a monomeric precatalyst of formula (II). The present invention further provides methods of making and using the precatalysts of the invention.

Definitions

As used herein, each of the following terms has the meaning associated with it in this section.

Unless defined otherwise, all technical and scientific terms used herein generally have the same meaning as commonly understood by one of ordinary skill in the art to which this invention belongs. Generally, the nomenclature used herein and the laboratory procedures in animal pharmacology, pharmaceutical science, separation science and organic chemistry are those well-known and commonly employed in the art.

As used herein, the articles "a" and "an" refer to one or to more than one (i.e., to at least one) of the grammatical object of the article. By way of example, "an element" means one element or more than one element.

As used herein, the term "about" is understood by persons of ordinary skill in the art and varies to some extent on the context in which it is used. As used herein when referring to a measurable value such as an amount, a temporal duration, and the like, the term "about" is meant to encompass variations of ±20% or ±10%, more preferably ±5%, even more preferably ±1%, and still more preferably ±0.1% from the specified value, as such variations are appropriate to perform the disclosed methods.

As used herein, the term "alkenyl," employed alone or in combination with other terms, means, unless otherwise stated, a stable monounsaturated or diunsaturated straight chain or branched chain hydrocarbon group having the stated number of carbon atoms. Examples include vinyl, propenyl (or allyl), crotyl, isopentenyl, butadienyl, 1,3-pentadienyl, 1,4-pentadienyl, and the higher homologs and isomers. A functional group representing an alkene is exemplified by —$CH_2$—CH=$CH_2$.

As used herein, the term "alkoxy," employed alone or in combination with other terms, means, unless otherwise stated, an alkyl group having the designated number of carbon atoms, as defined above, connected to the rest of the molecule via an oxygen atom, such as, for example, methoxy, ethoxy, 1-propoxy, 2-propoxy (isopropoxy) and the higher homologs and isomers. A specific example is ($C_1$-$C_3$)alkoxy, such as, but not limited to, ethoxy and methoxy.

As used herein, the term "alkyl," by itself or as part of another substituent, means, unless otherwise stated, a straight or branched chain hydrocarbon having the number of carbon atoms designated (i.e., $C_1$-$C_{10}$ means one to ten carbon atoms) and includes straight, branched chain, or cyclic substituent groups. Examples include methyl, ethyl, propyl, isopropyl, butyl, isobutyl, tert-butyl, pentyl, neopentyl, hexyl, and cyclopropylmethyl. A selected example is ($C_1$-$C_6$)alkyl, such as, but not limited to, ethyl, methyl, isopropyl, isobutyl, n-pentyl, n-hexyl and cyclopropylmethyl.

As used herein, the term "alkynyl," employed alone or in combination with other terms, means, unless otherwise stated, a stable straight chain or branched chain hydrocarbon group with a triple carbon-carbon bond, having the stated number of carbon atoms. Non-limiting examples include ethynyl and propynyl, and the higher homologs and isomers. The term "propargylic" refers to a group exemplified by —$CH_2$—C≡CH. The term "homopropargylic" refers to a group exemplified by —$CH_2CH_2$—C≡CH. The term "substituted propargylic" refers to a group exemplified by —$CR_2$—C≡CR', wherein each occurrence of R' is independently H, alkyl, substituted alkyl, alkenyl or substituted alkenyl, with the proviso that at least one R' group is not hydrogen. The term "substituted homopropargylic" refers to a group exemplified by —$CR'_2CR'_2$—C≡CR', wherein each occurrence of R' is independently H, alkyl, substituted alkyl, alkenyl or substituted alkenyl, with the proviso that at least one R' group is not hydrogen.

As used herein, the term "aromatic" refers to a carbocycle or heterocycle with one or more polyunsaturated rings and having aromatic character, i.e. having (4n+2) delocalized (pi) electrons, where n is an integer.

As used herein, the term "aryl," employed alone or in combination with other terms, means, unless otherwise stated, a carbocyclic aromatic system containing one or more rings (typically one, two or three rings) wherein such rings may be attached together in a pendent manner, such as a biphenyl, or may be fused, such as naphthalene. Examples include phenyl, anthracyl, and naphthyl.

As used herein, the term "aryl-($C_1$-$C_3$)alkyl" refers to a functional group wherein a one to three carbon alkylene chain is attached to an aryl group, e.g., —$CH_2CH_2$-phenyl or —$CH_2$-phenyl (benzyl). Specific examples are aryl-$CH_2$— and aryl-CH($CH_3$)—. The term "substituted aryl-($C_1$-$C_3$) alkyl" refers to an aryl-($C_1$-$C_3$)alkyl functional group in which the aryl group is substituted. A specific example is substituted aryl($CH_2$)—. Similarly, the term "heteroaryl-($C_1$-$C_3$)alkyl" refers to a functional group wherein a one to three carbon alkylene chain is attached to a heteroaryl group, e.g., —$CH_2CH_2$-pyridyl. A specific example is heteroaryl-($CH_2$)—. The term "substituted heteroaryl-($C_1$-$C_3$)alkyl" refers to a heteroaryl-($C_1$-$C_3$)alkyl functional group in which the heteroaryl group is substituted. A specific example is substituted heteroaryl-($CH_2$)—.

As used herein, the term "cycloalkyl," by itself or as part of another substituent, refers to, unless otherwise stated, a cyclic chain hydrocarbon having the number of carbon atoms designated (i.e., $C_3$-$C_6$ refers to a cyclic group comprising a ring group consisting of three to six carbon atoms) and includes straight, branched chain or cyclic substituent groups. Examples include cyclopropyl, cyclobutyl, cyclopentyl, cyclohexyl, cycloheptyl, and cyclooctyl. Other examples are ($C_3$-$C_6$)cycloalkyl, such as, but not limited to, cyclopropyl, cyclobutyl, cyclopentyl and cyclohexyl.

As used herein, the term "halide" refers to a halogen atom bearing a negative charge. The halide anions are fluoride ($F^-$), chloride ($Cl^-$), bromide ($Br^-$), and iodide ($I^-$).

As used herein, the term "halo" or "halogen" alone or as part of another substituent refers to, unless otherwise stated, a fluorine, chlorine, bromine, or iodine atom.

As used herein, the term "heteroalkenyl," by itself or in combination with another term, refers to, unless otherwise stated, a stable straight or branched chain monounsaturated or diunsaturated hydrocarbon group consisting of the stated number of carbon atoms and one or two heteroatoms selected from the group consisting of O, N, and S, and wherein the nitrogen and sulfur atoms may optionally be oxidized and the nitrogen heteroatom may optionally be quaternized. Up to two heteroatoms may be placed consecutively. Examples include —CH=CH—O—$CH_3$, —CH=CH—$CH_2$—OH, —$CH_2$—CH=N—$OCH_3$, —CH=CH—N($CH_3$)—$CH_3$, and —$CH_2$—CH=CH—$CH_2$—SH.

As used herein, the term "heteroalkyl," by itself or in combination with another term, refers to, unless otherwise stated, a stable straight or branched chain alkyl group consisting of the stated number of carbon atoms and one or two heteroatoms selected from the group consisting of O, N, and S, and wherein the nitrogen and sulfur atoms may be optionally oxidized and the nitrogen heteroatom may be optionally quaternized. The heteroatom(s) may be placed at any position of the heteroalkyl group, including between the rest of the heteroalkyl group and the fragment to which it is attached, as well as attached to the most distal carbon atom in the heteroalkyl group. Examples include: —O—$CH_2$—$CH_2$—$CH_3$, —$CH_2$—$CH_2$—$CH_2$—OH, —$CH_2$—$CH_2$—NH—$CH_3$, —$CH_2$—S—$CH_2$—$CH_3$, and —$CH_2CH_2$—S(=O)—$CH_3$. Up to two heteroatoms may be consecutive, such as, for example, —$CH_2$—NH—$OCH_3$, or —$CH_2$—S—S—$CH_3$.

As used herein, the term "heterocycle" or "heterocyclyl" or "heterocyclic," by itself or as part of another substituent, refers to, unless otherwise stated, an unsubstituted or substituted, stable, mono- or multi-cyclic heterocyclic ring system that consists of carbon atoms and at least one heteroatom selected from the group consisting of N, O, and S, and wherein the nitrogen and sulfur heteroatoms may be optionally oxidized, and the nitrogen atom may be optionally quaternized. The heterocyclic system may be attached, unless otherwise stated, at any heteroatom or carbon atom that affords a stable structure. A heterocycle may be aromatic or non-aromatic in nature. In certain embodiments, the heterocycle is a heteroaryl.

As used herein, the term "heteroaryl" or "heteroaromatic" refers to a heterocycle having aromatic character. A polycyclic heteroaryl may include one or more rings that are partially saturated. Examples include tetrahydroquinoline and 2,3-dihydrobenzofuryl.

Examples of non-aromatic heterocycles include monocyclic groups such as aziridine, oxirane, thiirane, azetidine, oxetane, thietane, pyrrolidine, pyrroline, imidazoline, pyrazolidine, dioxolane, sulfolane, 2,3-dihydrofuran, 2,5-dihydrofuran, tetrahydrofuran, thiophane, piperidine, 1,2,3,6-tetrahydropyridine, 1,4-dihydropyridine, piperazine, morpholine, thiomorpholine, pyran, 2,3-dihydropyran, tetrahydropyran, 1,4-dioxane, 1,3-dioxane, homopiperazine, homopiperidine, 1,3-dioxepane, 4,7-dihydro-1,3-dioxepin and hexamethyleneoxide.

Examples of heteroaryl groups include pyridyl, pyrazinyl, pyrimidinyl (such as, but not limited to, 2- and 4-pyrimidinyl), pyridazinyl, thienyl, furyl, pyrrolyl, imidazolyl, thiazolyl, oxazolyl, pyrazolyl, isothiazolyl, 1,2,3-triazolyl, 1,2,4-triazolyl, 1,3,4-triazolyl, tetrazolyl, 1,2,3-thiadiazolyl, 1,2,3-oxadiazolyl, 1,3,4-thiadiazolyl and 1,3,4-oxadiazolyl.

Examples of polycyclic heterocycles include indolyl (such as, but not limited to, 3-, 4-, 5-, 6- and 7-indolyl), indolinyl, quinolyl, tetrahydroquinolyl, isoquinolyl (such as, but not limited to, 1- and 5-isoquinolyl), 1,2,3,4-tetrahydroisoquinolyl, cinnolinyl, quinoxalinyl (such as, but not limited to, 2- and 5-quinoxalinyl), quinazolinyl, phthalazinyl, 1,8-naphthyridinyl, 1,4-benzodioxanyl, coumarin, dihydrocoumarin, 1,5-naphthyridinyl, benzofuryl (such as, but not limited to, 3-, 4-, 5-, 6- and 7-benzofuryl), 2,3-dihydrobenzofuryl, 1,2-benzisoxazolyl, benzothienyl (such as, but not limited to, 3-, 4-, 5-, 6-, and 7-benzothienyl), benzoxazolyl, benzothiazolyl (such as, but not limited to, 2-benzothiazolyl and 5-benzothiazolyl), purinyl, benzimidazolyl, benztriazolyl, thioxanthinyl, carbazolyl, carbolinyl, acridinyl, pyrrolizidinyl, and quinolizidinyl.

The aforementioned listing of heterocyclic and heteroaryl moieties is intended to be representative and not limiting.

As used herein, the term "ligand" refers to any organic or inorganic molecule or ion that is capable of coordinating to a metal center. In certain embodiments, the ligand comprises one or more lone electron pairs that can coordinate with a metal center.

As used herein, the term "precatalyst" refers to a transition-metal-containing complex that, under specific reaction conditions, is converted to an active cross-coupling catalyst. In certain embodiments, the precatalyst is dimeric, i.e., contains two transition metals per molecule. In other embodiments, the precatalyst is monomeric, i.e., contains one transition metal per molecule. In yet other embodiments, conversion of the precatalyst to the active cross-coupling catalyst comprises contacting the precatalyst with a selected ligand.

As used herein, the following terms refer to the respective compounds:

AlPhos (Di-1-adamantyl(4''-butyl-2'',3'',5'',6''-tetrafluoro-2',4',6'-triisopropyl-2-methoxy-meta-terphenyl)phosphine), AmPhos (di-t-butylphosphino-4-dimethylaminobenzene), 1,2-bis(dichlorophosphino) ethane, BrettPhos (2-(Dicyclohexylphosphino)-3,6-dimethoxy-2',4',6'-triisopropyl-1,1'-biphenyl), $^{Ad}$BrettPhos (2-(Diadamantylphosphino)-2',4',6'-triisopropyl-3,6-dimethoxy-1,1'-biphenyl), $^{tBu}$BrettPhos (2-(Di-tert-butylphosphino)-2',4',6'-triisopropyl-3,6-dimethoxy-1,1'-biphenyl), BINAP (2,2'-bis(diphenylphosphino)-1,1'-binaphthyl), BippyPhos (5-(Di-tert-butylphosphino)-1',3',5'-triphenyl-1'H-[1,4']bipyrazole), DavePhos (2-dicyclohexylphosphino-2'-(N,N-dimethylamino)biphenyl), $^{tBu}$DavePhos (2-Di-tert-butylphosphino-2'-(N,N-dimethylamino)biphenyl), dcpe (1,2-bis(dicyclohexylphosphino)-ethane), dppb (1,4-bis(diphenylphosphino)butane), dppe (1,2-bis(diphenylphosphino)ethane), DPPF (1,1'-bis(diphenylphosphino)ferrocene), DPEPhos (bis[(2-diphenylphosphino) phenyl] ether), dppm (1,1-bis(diphenylphosphino)methane), dppp (1,3-bis(diphenylphosphino)propane), IPr (1,3-bis(2,6-diisopropylphenyl)-1,3-dihydro-2H-imidazol-2-ylidene), IPr*OMe (1,3-bis(2,6-bis-(diphenylmethyl)-4-methoxyphenyl)imidazol-2-ylidene), Me-DalPhos (2-(Di-1-adamantylphosphino) phenylpiperidine), Mor-DalPhos (Di(1 1-adamantyl)-2-morpholinophenylphosphine), NiXantPhos (4,6-bis (diphenylphosphanyl)-10 OH-phenoxazine), PipDalPhos (1-(2-(di(((3S,5S,7S)-adamantan-1-yl)phosphanyl)phenyl)piperidine), QPhos (1,2,3,4,5-pentaphenyl-1'-(di-tert-butylphosphino) ferrocene), RockPhos (2-Di(tert-butyl)phosphino-2',4',6'-triisopropyl-3-methoxy-6-methylbiphenyl), RuPhos (2-dicyclohexylphosphino-2',6'-diisopropoxybiphenyl), SPhos (2-dicyclohexylphosphino-2',6'-dimethoxybiphenyl), TrippyPhos (1-[2-[Bis(tert-butyl)phosphino]phenyl]-3,5-diphenyl-1H-pyrazole), XantPhos (4,5-bis(diphenylphosphino)-9,9-dimethylxanthene), XPhos (2-dicyclohexylphosphino-2',4',6'-triisopropylbiphenyl), $^{Me4tBu}$XPhos (2-Di-tert-butylphosphino-3,4,5,6-tetramethyl-2',4',6'-triisopropyl-1,1'-biphenyl), $^{tBu}$XPhos (2-Di-tert-butylphosphino-2',4',6'-triisopropylbiphenyl).

As used herein, the term "substituted" refers to that an atom or group of atoms has replaced hydrogen as the substituent attached to another group.

As used herein, the term "substituted alkyl," "substituted cycloalkyl," "substituted alkenyl" or "substituted alkynyl" refers to alkyl, cycloalkyl, alkenyl or alkynyl, as defined above, substituted by one, two or three substituents selected from the group consisting of halogen, —OH, alkoxy, tetrahydro-2-H-pyranyl, —NH$_2$, —N(CH$_3$)$_2$, (1-methyl-imidazol-2-yl), pyridin-2-yl, pyridin-3-yl, pyridin-4-yl, —C(=O) OH, trifluoromethyl, —C≡N, —C(=O)O(C$_1$-C$_4$)alkyl, —C(=O)NH$_2$, —C(=O)NH(C$_1$-C$_4$)alkyl, —C(=O)N ((C$_1$-C$_4$)alkyl)$_2$, —SO$_2$NH$_2$, —C(=NH)NH$_2$, and —NO$_2$, preferably containing one or two substituents selected from halogen, —OH, alkoxy, —NH$_2$, trifluoromethyl, —N(CH$_3$)$_2$, and —C(=O)OH, more preferably selected from halogen, alkoxy and —OH. Examples of substituted alkyls include, but are not limited to, 2,2-difluoropropyl, 2-carboxycyclopentyl and 3-chloropropyl.

For aryl, aryl-(C$_1$-C$_3$)alkyl and heterocyclyl groups, the term "substituted" as applied to the rings of these groups refers to any level of substitution, namely mono-, di-, tri-, tetra-, or penta-substitution, where such substitution is permitted. The substituents are independently selected, and substitution may be at any chemically accessible position. In certain embodiments, the substituents vary in number between one and four. In another embodiment, the substituents vary in number between one and three. In yet another embodiment, the substituents vary in number between one and two. In yet another embodiment, the substituents are independently selected from the group consisting of C$_{1-6}$ alkyl, —OH, C$_{1-6}$ alkoxy, halo, amino, acetamido and nitro. As used herein, where a substituent is an alkyl or alkoxy group, the carbon chain may be branched, straight or cyclic.

As used herein, the term "triflate" or "OTf" refers to a trifluoromethanesulfonate group or anion, alternatively denoted as CF$_3$S(=O)$_2$O$^-$.

As used herein, the term "tosylate" or "OTs" refers to a p-toluenesulfonate group or anion, alternatively denoted as p-CH$_3$—C$_6$H$_4$S(=O)$_2$O$^-$.

As used herein, the term "triflimide" refers to a bis (trifluoromethanesulfonyl)amide group or anion, alternatively denoted as (CF$_3$SO$_2$)$_2$N$^-$.

As used herein, the term "pseudohalide" refers to any of a family of polyatomic analogues of halides, having similar bonding characteristics to the true halogens.

Pseudohalides can include, but are not limited to, cyano, isocyanide, sulfhydryl, isothiocyanate, azide and triflate groups.

Ranges: throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual and partial numbers within that range, for example, 1, 2, 2.7, 3, 4, 5, 5.3, and 6. This applies regardless of the breadth of the range.

DESCRIPTION

The present invention relates to the unexpected discovery of novel transition-metal precatalysts that are useful in preparing active coupling catalysts. In certain embodiments, the precatalysts of the invention are air-stable and moisture-stable. The present invention provides methods of making and using the precatalysts of the invention.

In one aspect, an important feature in the effectiveness of Pd(II) precatalysts is the rate and efficiency of their conversion into the monoligated L-Pd(0) active species under the reaction conditions. For example, the efficiency of Nolan type ($\eta^3$-allyl)Pd(NHC)(Cl) (NHC=N-heterocyclic carbene) precatalysts relates to two factors: (i) the rate of activation of the ligated precatalyst scaffold to form the catalytically active L-Pd(0) species, and (ii) comproportionation between L-Pd(0) and the starting precatalyst, which forms a Pd(I) μ-allyl dimer of the form (μ-allyl)(μ-Cl)Pd$_2$(L)$_2$ and removes the L-Pd(0) from the reaction mixture (FIG. 2).

As demonstrated herein, improved precatalysts can be designed by further increasing the barrier to comproportionation. In certain embodiments, the speed at which the Pd(II) precatalyst is converted into Pd(0) is increased, so that the conversion of Pd(II) to Pd(0) is significantly faster than deleterious comproportionation between Pd(II) and Pd(0) to form Pd(I). In certain embodiments, the precatalysts of the invention take part in catalysis without forming significant amounts of inactive Pd(I) dimers. In other embodiments, the precatalysts of the invention are compatible with phosphine or NHC ligands.

The present disclosure provides novel precatalysts of formula ($\eta^3$-indenyl)Pd(L)X), wherein X is a non-coordinating or weakly coordinating ligand (such as triflate or trifluoromethane sulfonate, $^-$OTf). The precatalysts of the invention are significantly more catalytically efficient than ($\eta^3$-cinnamyl)Pd(IPr)Cl) for the Suzuki-Miyaura reaction. In certain embodiments, the dimeric compound ($\eta^3$-indenyl)$_2$(μ-OTf)$_2$Pd$_2$ is used as a precatalyst in combination with an appropriate ligand, L, and is a superior precatalyst as compared to its dimeric analogue ($\eta^3$-cinnamyl)$_2$(μ-Cl)$_2$Pd$_2$. In certain embodiments, the precatalyst of formula ($\eta^3$-indenyl)Pd(L)(OTf) is isolable when L is a bulky bidentate ligand, whereas the ($\eta^3$-1-$^t$Bu-indenyl)Pd(L)Cl) analogue with the same bulky bidentate ligand L is not (see FIG. 4). In other embodiments, the precatalysts of formula ($\eta^3$-indenyl)Pd(L)(OTf) are as active and efficient as ($\eta^3$-1-$^t$Bu-indenyl)Pd(L)Cl) analogues.

In certain embodiments, the novel precatalyst scaffold of the invention can be used at least in the following reactions: Suzuki-Miyaura, Buchwald-Hartwig, Kumada, Sonogashira, Heck, C—S and C—O bond formation, α-arylation of aldehydes, α-arylation of ketones, α-arylation of amides, α-arylation of heterocycles, and anaerobic oxidation of alcohols.

Synthesis of Pd(II) Indenyl Complexes

The indenyl chloride dimer ($\eta^3$-indenyl)$_2$(μ-Cl)$_2$Pd$_2$ (3a) can be converted into the indenyl triflate dimer ($\eta^3$-indenyl)$_2$(μ-OTf)$_2$Pd$_2$ (3a-OTf) through reaction with silver triflate (AgOTf) in one step.

Figure 4:
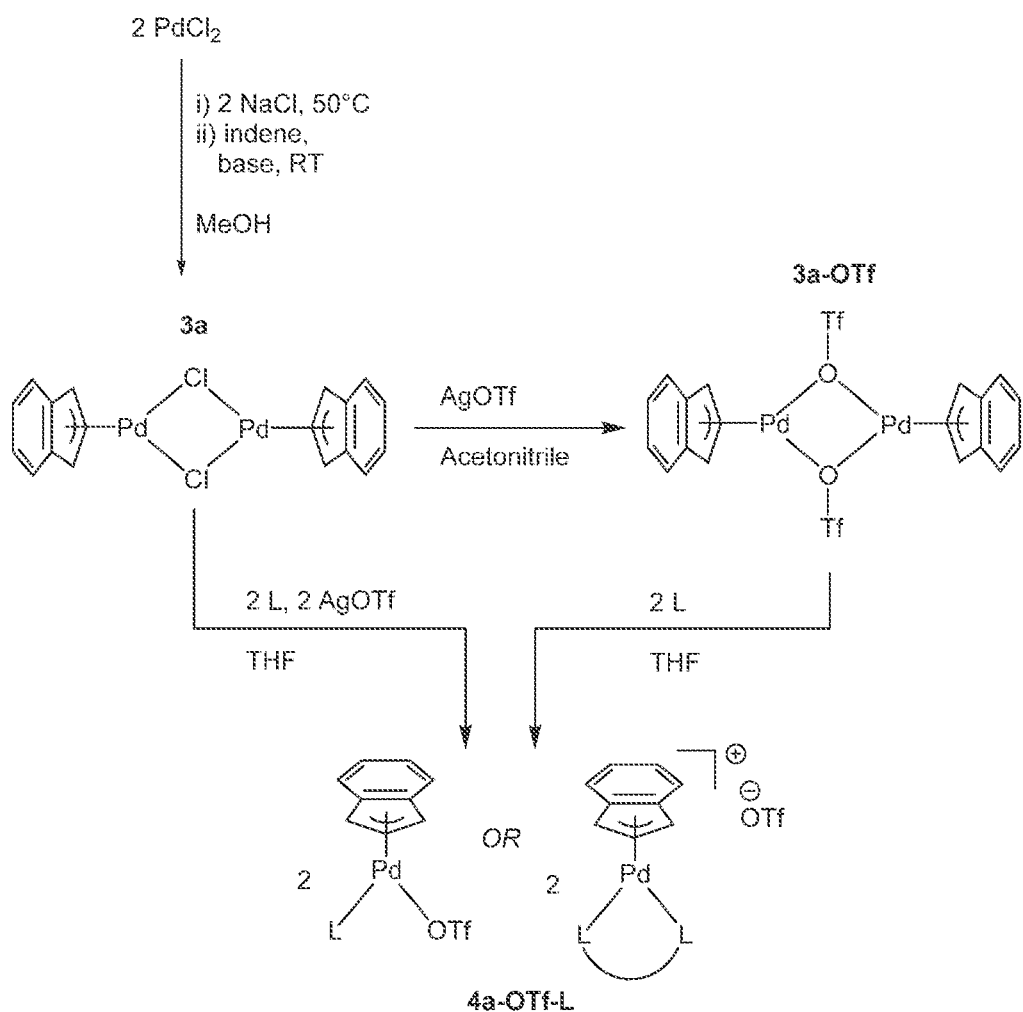
FIG. 4 is a scheme illustrating an exemplary synthesis of the indenyl dimer precatalyst scaffold comprising bridging triflates, as well as monodentate and bidentate ligand supported indenyl triflate precatalysts.
Figure 6:
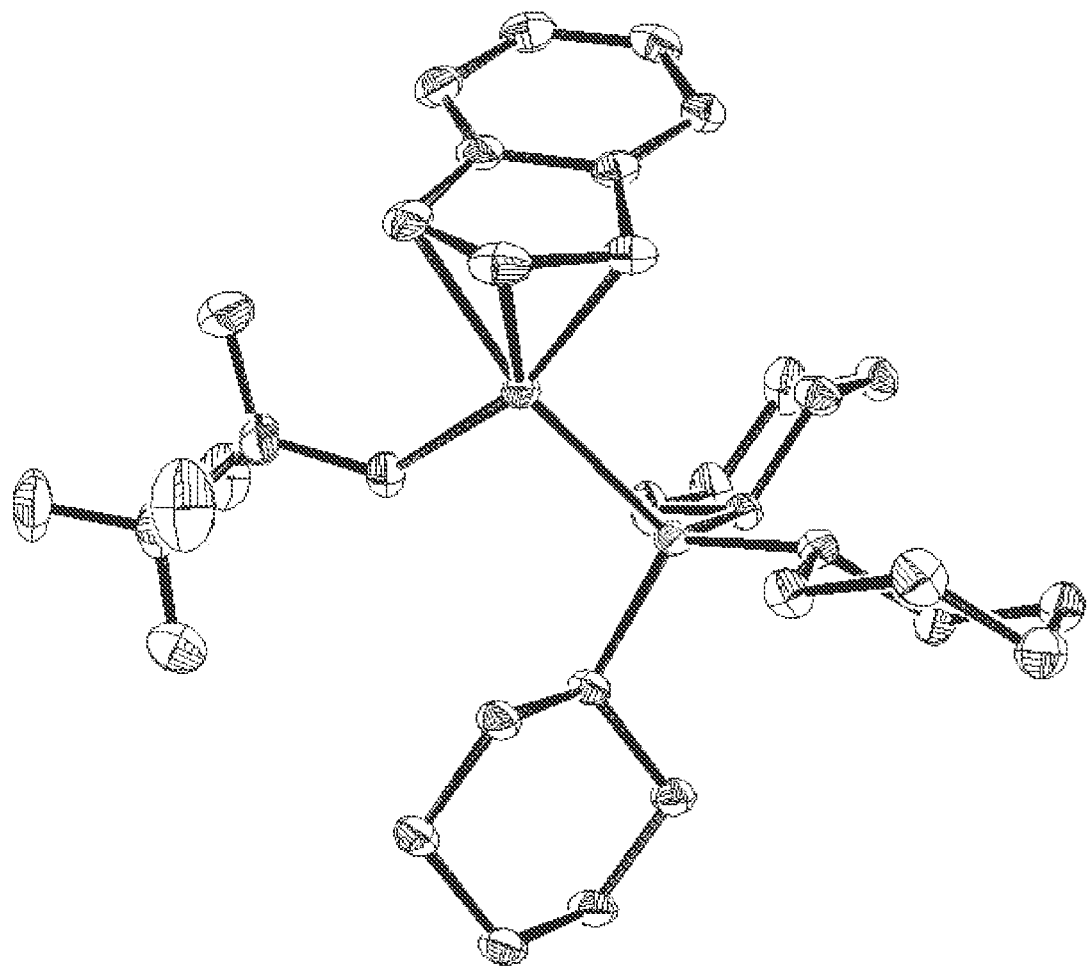
FIG. 6 is an exemplary ORTEP of the ($\eta^3$-Indenyl)Pd (PCy$_3$)(OTf) precatalyst. Ellipsoids shown at 30% probability. Hydrogen atoms are omitted for clarity.

As demonstrated herein, the indenyl chloride dimer ($\eta^3$-indenyl)$_2$(μ-Cl)$_2$Pd$_2$ (3a) can be prepared in a one-pot synthesis under aerobic conditions, without the use of air sensitive equipment (FIG. 4). In an illustrative synthesis of the invention, one equivalent of Na$_2$PdCl$_4$ (generated in situ from PdCl$_2$ and two equivalents of NaCl) was treated with indene and Na$_2$CO$_3$ or NaHCO$_3$ in MeOH. The mixture was stirred for two hours at room temperature. During this time, a brown solid precipitated out of solution, which was then filtered and washed successively with water and diethyl ether to give 3a in high yield (84%) and purity. Subsequently, the dimeric chloride complex was converted into the dimeric indenyl triflate dimer ($\eta^3$-indenyl)$_2$(μ-OTf)$_2$Pd$_2$ (3a-OTf) by treating the chloride complex with two equivalents of AgOTf in acetonitrile. The triflate dimer complex 3a-OTf was isolated in high yield (88%).

The dimeric complex were then treated with two equivalents of L to generate a series of monomeric complexes ($\eta^3$-indenyl)Pd(L)(OTf) (4a-OTf-L). The new complexes 4a-OTf-L were characterized by $^1$H and $^{31}$P NMR spectroscopy for complexes wherein L is XPhos (81%), $^t$BuXPhos (92%), BrettPhos (90%), $^t$BuBrettPhos (82%), AdBrettPhos (85%), Me₄ᵗBuPhos (90%), RockPhos (80%), AlPhos (81%), MorDalPhos (90%), PipDalPhos (95%), and TrippyPhos (80%).

Alternatively, the monomeric complexes (η³-indenyl)Pd(L)(OTf) (4a-OTf-L) can be generated through a one-pot reaction from the indenyl chloride dimer (η³-indenyl)₂(μ-Cl)₂Pd₂ (3a) by reacting the chloride dimer with AgOTf and two equivalents of the appropriate L ligand in THF.

Precatalysts

In one aspect, the invention provides a precatalyst of formula (I), or a salt or solvate thereof:

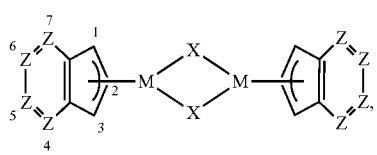

wherein in (I):
  each occurrence of M is independently a transition metal;
  each occurrence of X is independently a non-coordinating or weakly coordinating ligand, such as, but not limited to, triflate or trifluoromethanesulfonate (or a partially fluorinated alkanesulfonate and/or any other perfluoroalkanesulfonate, such as, but not limited to, pentafluoroethanesulfonate, heptafluoropropanesulfonate, and/or nonafluorobutanesulfonate), halide, mesylate, tetrafluoroborate, hexafluorophosphate, hexafluoroantimonate, tetraphenylborate, acetate, trifluoroacetate, acetylacetonate (acac), triflimide, or tosylate;
  each occurrence of Z is independently CH, CR or N, with the proviso that 0-2 Z groups are N; or the Z groups at the 5- and 6-positions are null and the Z groups at the 4- and 7-positions are independently R;
  each occurrence of R is independently selected from the group consisting of $C_1$-$C_6$ alkyl, substituted $C_1$-$C_6$ alkyl, $C_3$-$C_8$ cycloalkyl, substituted $C_3$-$C_8$ cycloalkyl, $C_2$-$C_6$ alkenyl, substituted $C_2$-$C_6$ alkenyl, $C_2$-$C_6$ alkynyl, substituted $C_2$-$C_6$ alkynyl, phenyl, substituted phenyl, phenylalkyl, substituted phenylalkyl, aryl (such as, for example, naphthyl), substituted aryl, aryl-$C_1$-$C_6$ alkyl, substituted aryl-$C_1$-$C_6$ alkyl, heteroaryl-$C_1$-$C_6$ alkyl, substituted heteroaryl-$C_1$-$C_6$ alkyl, heteroaryl, and substituted heteroaryl.

In certain embodiments, the two occurrences of X are not the same. In other embodiments, the two occurrences of X are the same. In yet other embodiments, X is a perfluoroalkanesulfonate. In yet other embodiments, X is a partially fluorinated alkanesulfonate. In yet other embodiments, each occurrence of X is an independently selected perfluoroalkanesulfonate. In yet other embodiments, each occurrence of X is the same perfluoroalkanesulfonate. In yet other embodiments, each occurrence of X is an independently selected partially fluorinated alkanesulfonate. In yet other embodiments, each occurrence of X is the same partially fluorinated alkanesulfonate. In yet other embodiments, the perfluoroalkanesulfonate is triflate (trifluoromethanesulfonate). In yet other embodiments, the perfluoroalkanesulfonate is pentafluoroethanesulfonate. In yet other embodiments, the perfluoroalkanesulfonate is heptafluoropropanesulfonate. In yet other embodiments, the perfluoroalkanesulfonate is nonafluorobutanesulfonate. In yet other embodiments, each occurrence of X is triflate. In yet other embodiments, each occurrence of X is pentafluoroethanesulfonate. In yet other embodiments, each occurrence of X is heptafluoropropanesulfonate. In yet other embodiments, each occurrence of X is nonafluoroethanesulfonate. In yet other embodiments, X is halide. In yet other embodiments, X is selected from the group consisting of Cl, Br, and I. In yet other embodiments, X is Cl. In yet other embodiments, X is Br. In yet other embodiments, X is I. In yet other embodiments, X is mesylate. In yet other embodiments, X is tetrafluoroborate. In yet other embodiments, X is hexafluorophosphate. In yet other embodiments, X is hexafluoroantimonate. In yet other embodiments, X is tetraphenylborate. In yet other embodiments, X is acetate. In yet other embodiments, X is trifluoroacetate. In yet other embodiments, X is acetylacetonate (acac). In yet other embodiments, X is triflimide. In yet other embodiments, X is tosylate. In yet other embodiments, each occurrence of X is halide. In yet other embodiments, each occurrence of X is mesylate. In yet other embodiments, each occurrence of X is tetrafluoroborate. In yet other embodiments, each occurrence of X is hexafluorophosphate. In yet other embodiments, each occurrence of X is hexafluoroantimonate. In yet other embodiments, each occurrence of X is tetraphenylborate. In yet other embodiments, each occurrence of X is acetate. In yet other embodiments, each occurrence of X is trifluoroacetate. In yet other embodiments, each occurrence of X is acetylacetonate (acac). In yet other embodiments, each occurrence of X is triflimide. In yet other embodiments, each occurrence of X is tosylate.

In certain embodiments, each occurrence of M is independently selected from the group consisting of Pd, Ni, and Pt. In other embodiments, the two occurrences of M in (I) are identical. In yet other embodiments, the two occurrences of M in (I) are not identical. In yet other embodiments, the two occurrences of M in (I) are Pd. In yet other embodiments, the two occurrences of M in (I) are Ni. In yet other embodiments, the two occurrences of M in (I) are Pt.

In certain embodiments, the two ligands comprising the 5-membered ring are identical. In other embodiments, the two ligands comprising the 5-membered ring are not identical.

In certain embodiments, each of the 5-membered rings is unsubstituted at the 1, 2 and 3 positions, having only CH groups therein.

In certain embodiments, each occurrence of Z is independently selected from the group consisting of CH and CR, so the precatalyst of formula (I) is a substituted indenyl complex.

In certain embodiments, none of the Z groups is N. In other embodiments, one of the Z groups is N. In yet other embodiments, two of the Z groups is N.

In another aspect, the invention provides a precatalyst of formula (II), or a salt or solvate thereof:

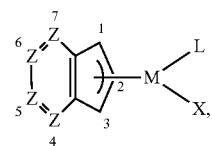

wherein in (II):
  M is a transition metal;
  X is a non-coordinating or weakly coordinating ligand, such as, but not limited to, triflate or trifluoromethanesulfonate (or a partially fluorinated alkanesulfonate or any other perfluoroalkanesulfonate, such as, but not limited to, pentafluoroethanesulfonate, heptafluoropropanesulfonate, and/or nonafluorobutanesulfonate), halide, mesylate, tetrafluoroborate, hexafluorophosphate, hexafluoroantimonate, tetraphenylborate, acetate, trifluoroacetate, acetylacetonate (acac), triflimide, or tosylate;

each occurrence of Z is independently CH, CR or N, with the proviso that 0-2 Z groups are N; or the Z groups at the 5- and 6-positions are null and the Z groups at the 4- and 7-positions are independently R;

each occurrence of R is independently selected from the group consisting of $C_1$-$C_6$ alkyl, substituted $C_1$-$C_6$ alkyl, $C_3$-$C_8$ cycloalkyl, substituted $C_3$-$C_8$ cycloalkyl, $C_2$-$C_6$ alkenyl, substituted $C_2$-$C_6$ alkenyl, $C_2$-$C_6$ alkynyl, substituted $C_2$-$C_6$ alkynyl, phenyl, substituted phenyl, phenylalkyl, substituted phenylalkyl, aryl (such as, for example, naphthyl), substituted aryl, aryl-$C_1$-$C_6$ alkyl, substituted aryl-$C_1$-$C_6$ alkyl, heteroaryl-$C_1$-$C_6$ alkyl, substituted heteroaryl-$C_1$-$C_6$ alkyl, heteroaryl, and substituted heteroaryl; and L is a monodentate or bidentate ligand.

In certain embodiments, none of the Z groups is N. In other embodiments, one of the Z groups is N. In yet other embodiments, two of the Z groups is N.

In certain embodiments, X is a perfluoroalkanesulfonate. In other embodiments, X is a partially fluorinated alkanesulfonate. In yet other embodiments, the perfluoroalkanesulfonate is triflate. In yet other embodiments, the perfluoroalkanesulfonate is pentafluoroethanesulfonate. In yet other embodiments, the perfluoroalkanesulfonate is heptafluoropropanesulfonate. In yet other embodiments, the perfluoroalkanesulfonate is nonafluorobutanesulfonate. In yet other embodiments, X is triflate. In yet other embodiments, X is pentafluoroethanesulfonate. In yet other embodiments, X is heptafluoropropanesulfonate. In yet other embodiments, X is nonafluoroethanesulfonate. In yet other embodiments, X is halide. In yet other embodiments, X is selected from the group consisting of Cl, Br, and I. In yet other embodiments, X is Cl. In yet other embodiments, X is Br. In yet other embodiments, X is I. In yet other embodiments, X is mesylate. In yet other embodiments, X is tetrafluoroborate. In yet other embodiments, X is hexafluorophosphate. In yet other embodiments, X is hexafluoroantimonate. In yet other embodiments, X is tetraphenylborate. In yet other embodiments, X is acetate. In yet other embodiments, X is trifluoroacetate. In yet other embodiments, X is acetylacetonate (acac). In yet other embodiments, X is triflimide. In yet other embodiments, X is tosylate. In certain embodiments, L is a bidentate ligand, represented as

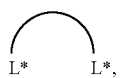

wherein each L* is independently selected as a monodentate ligand group (also known as a coordinating center). In other embodiments, L is a bidentate ligand, and X coordinates to M. In yet other embodiments, L is a bidentate ligand and X does not coordinate to M (i.e., there is no coordination between X and M). In yet other embodiments, the two coordinating centers in the bidentate ligand L are coordinated with M as depicted in formula (IIA):

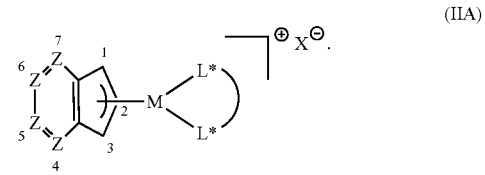

In certain embodiments, M is selected from the group consisting of Pd, Ni and Pt. In other embodiments, M is Pd. In yet other embodiments, M is Ni. In yet other embodiments, M is Pt.

In certain embodiments, L is at least one selected from the group consisting of a phosphine, a N-heterocyclic carbene, a N-containing ligand, an O-containing ligand, and a S-containing ligand. In certain embodiments, L is a phosphine. In certain embodiments, L is a N-heterocyclic carbine. In certain embodiments, L is a N-containing ligand. In certain embodiments, L is an O-containing ligand. In certain embodiments, L is a S-containing ligand.

In certain embodiments, L is not a monodentate phosphine ligand. In other embodiments, L is not a monodentate phosphine ligand of formula PR*$_3$, wherein each occurrence of R* is independently selected from the group consisting of phenyl, cyclohexyl, methyl and methoxy. In yet other embodiments, L is P$^t$Bu$_3$.

In certain embodiments, L is selected from the group consisting of optionally substituted 1,3-dihydro-2H-imidazol-2-ylidene, optionally substituted 1,3,4,5-tetrahydro-2H-imidazol-2-ylidene, and optionally substituted 1,2,4-triazol-5-ylidene. In other embodiments, L is optionally substituted 1,3-dihydro-2H-imidazol-2-ylidene. In yet other embodiments, L is optionally substituted 1,3,4,5-tetrahydro-2H-imidazol-2-ylidene. In yet other embodiments, L is and optionally substituted 1,2,4-triazol-5-ylidene. In yet other embodiments, the optional substitution comprises 1-4 substituents independently selected from the group consisting of $C_1$-$C_6$ alkyl, halo, $C_1$-$C_6$ alkyl, hydroxy and $C_1$-$C_6$ alkoxy. In yet other embodiments, L is 1,3-bis(2,6-diisopropylphenyl)-1,3-dihydro-2H-imidazol-2-ylidene.

In certain embodiments, L is at least one selected from the group consisting of PAd$_3$ (Ad=admantyl), trinaphthlphosphine, tri(pentafluorophenyl)phosphine, Diphenyl-2-pyridylphosphine, tri(2-furyl)phosphine, tri(n-octyl)phosphine, dimethylphenylphosphine, AmPhos (di-t-butylphosphino-4-dimethylaminobenzene), DavePhos (2-dicyclohexyl phosphino-2'-(N,N-dimethylamino)biphenyl), $^{tBu}$DavePhos (2-Di-tert-butylphosphino-2'-(N,N-dimethylamino)biphenyl), QPhos (1,2,3,4,5-pentaphenyl-1'-(di-tert-butylphosphino) ferrocene), RuPhos (2-dicyclohexylphosphino-2',6'-diisopropoxybiphenyl), SPhos (2-dicyclohexylphosphino-2',6'-dimethoxybiphenyl), XPhos (2-dicyclohexylphosphino-2',4',6'-triisopropylbiphenyl), $^{tBu}$XPhos (2-Di-tert-butylphosphino-2',4',6'-triisopropylbiphenyl), $^{Me4tBu}$XPhos (2-Di-tert-butylphosphino-3,4,5,6-tetramethyl-2',4',6'-triisopropyl-1,1'-biphenyl), BrettPhos (2-(Dicyclohexylphosphino)3,6-dimethoxy-2',4',6'-triisopropyl-1,1'-biphenyl), $^{tBu}$BrettPhos (2-(Di-tert-butylphosphino)-2',4',6'-triisopropyl-3,6-dimethoxy-1,1'-biphenyl), $^{Ad}$BrettPhos (2-(Diadamantylphosphino)-2',4',6'-triisopropyl-3,6-dimethoxy-1,1'-biphenyl), Me-DalPhos (2-(Di-1-adamantylphosphino) phenylpiperidine), Mor-DalPhos (Di (1-adamantyl)-2-morpholinophenylphosphine), Di(1-adamantyl)-1-piperidinyl-phenylphosphine), RockPhos (2-Di(tert-butyl)phosphino-2',4',6'-triisopropyl-3-methoxy- 6-methylbiphenyl), AlPhos (Di-1-adamantyl(4"-butyl-2",3", 5",6"-tetrafluoro-2',4',6'-triisopropyl-2-methoxy-meta-terphenyl)phosphine), PipDalPhos (1-(2-(di((3S,5S,7S)-adamantan-1-yl)phosphanyl)phenyl)piperidine), TrippyPhos (1-[2-[Bis(tert-butyl)phosphino]phenyl]-3,5-diphenyl-1H-pyrazole) and BippyPhos (5-(Di-tert-butylphosphino)-1',3',5'-triphenyl-1'H-[1,4']bipyrazole).

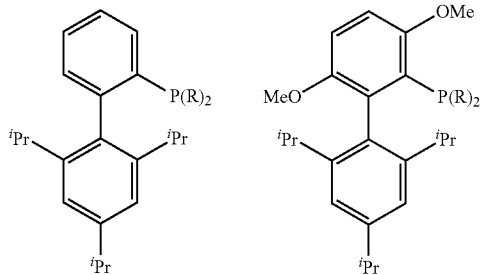

XPhos (R = Cy)
<sup>t</sup>BuXPhos (R = <sup>t</sup>Bu)

BrettPhos (R = Cy)
<sup>t</sup>BuBrettPhos (R = <sup>t</sup>Bu)
AdBrettPhos (R = Ad)

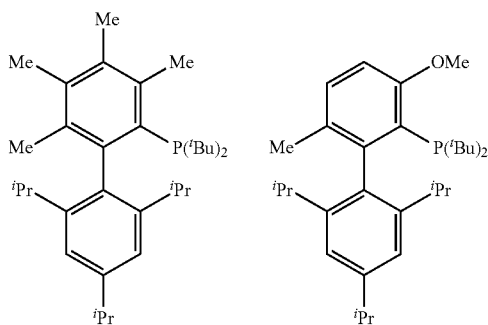

Me<sub>4</sub><sup>t</sup>BuXPhos

RockPhos

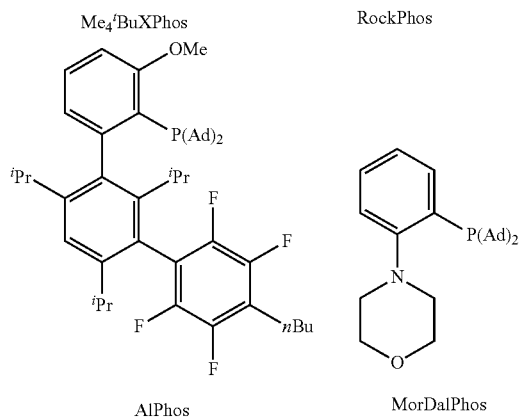

AlPhos

MorDalPhos

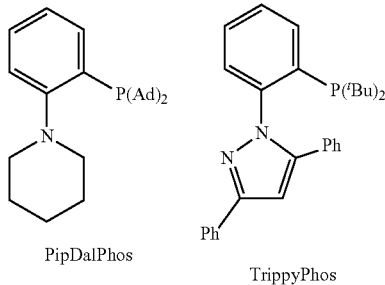

PipDalPhos

TrippyPhos

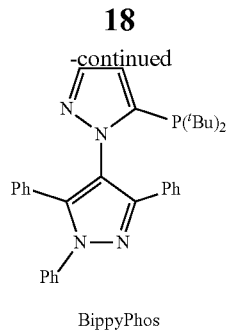

BippyPhos

In certain embodiments, L is a bidentate phosphine ligand. In other embodiments, L is selected from the group consisting of 1,1'-bis(diphenylphosphino) ferrocene (DPPF), 4,5-bis(diphenylphosphino)-9,9-dimethylxanthene (XantPhos), 4,6-bis (diphenylphosphanyl)-10H-phenoxazine (NiXantPhos), 1,2-bis(diphenylphosphino)ethane (dppe), 1,1-bis(diphenylphosphino)methane (dppm), 1,3-bis(diphenylphosphino)propane (dppp), 1,4-bis(diphenylphosphino)butane (dppb), 2,2'-bis(diphenylphosphino)-1,1'-binaphthyl (BINAP), bis[(2-diphenylphosphino)phenyl] ether (DPEPhos), 1,2-bis(dichlorophosphino) ethane, and 1,2-bis(dicyclohexylphosphino) ethane (dcpe).

In certain embodiments, L is a ligand that can form a complex of formula (II) and/or (IIA), but cannot form a complex of formula:

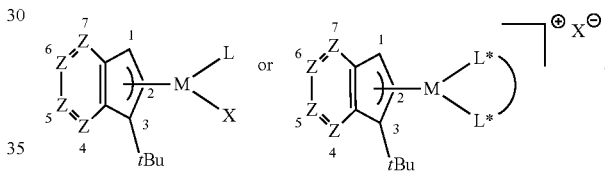

In certain embodiments, L is a ligand selected from the group consisting of <sup>tBu</sup>DavePhos (2-Di-tert-butylphosphino-2'-(N,N-dimethylamino)biphenyl), <sup>tBu</sup>XPhos (2-Di-tert-butylphosphino-2',4',6'-triisopropylbiphenyl), <sup>Me4tBu</sup>XPhos (2-Di-tert-butylphosphino-3,4,5,6-tetramethyl-2',4',6'-triisopropyl-1,1'-biphenyl), <sup>tBu</sup>BrettPhos (2-(Di-tert-butylphosphino)-2',4',6'-triisopropyl-3,6-dimethoxy-1,1'-biphenyl), <sup>Ad</sup>BrettPhos (2-(Diadamantylphosphino)-2',4',6'-triisopropyl-3,6-dimethoxy-1,1'-biphenyl), Me-DalPhos (2-(Di-1-adamantylphosphino) phenylpiperidine), Mor-DalPhos (Di (1-adamantyl)-2-morpholinophenylphosphine), Di(1-adamantyl)-1-piperidinyl-phenylphosphine), RockPhos (2-Di(tert-butyl)phosphino-2',4',6'-triisopropyl-3-methoxy-6-methylbiphenyl), AlPhos (Di-1-adamantyl(4"-butyl-2",3", 5",6"-tetrafluoro-2',4',6'-triisopropyl-2-methoxy-meta-terphenyl)phosphine), PipDalPhos (1-(2-(di((3S,5S,7S)-adamantan-1-yl)phosphanyl)phenyl) piperidine), TrippyPhos (1-[2-[Bis(tert-butyl)phosphino]phenyl]-3,5-diphenyl-1H-pyrazole) and BippyPhos (5-(Di-tert-butylphosphino)-1',3',5'-triphenyl-1'H-[1,4']bipyrazole).

In certain embodiments, L is NR'R"R"', wherein R", R" and R"' are independently selected from the group consisting of alkyl, substituted alkyl, cycloalkyl, substituted cycloalkyl, alkenyl, substituted alkenyl, alkynyl, substituted alkynyl, phenyl, substituted phenyl, phenylalkyl, substituted phenylalkyl, aryl, substituted aryl, arylalkyl, substituted arylalkyl, heteroarylalkyl, substituted heteroarylalkyl, heteroaryl and substituted heteroaryl, wherein two or three R substituents may be optionally covalently linked to form a cyclic structure with N.

In certain embodiments, L is R'OR", wherein R" and R" are independently selected from the group consisting of alkyl, substituted alkyl, cycloalkyl, substituted cycloalkyl, alkenyl, substituted alkenyl, alkynyl, substituted alkynyl, phenyl, substituted phenyl, phenylalkyl, substituted phenylalkyl, aryl, substituted aryl, arylalkyl, substituted arylalkyl, heteroarylalkyl, substituted heteroarylalkyl, heteroaryl and substituted heteroaryl, wherein R' and R" may be optionally covalently linked to form a cyclic structure with O. In other embodiments, L is an optionally substituted furan or tetrahydrofuran. In yet other embodiments, L is an ester, ketone or aldehyde.

In certain embodiments, L is R'SR", wherein R" and R" are independently selected from the group consisting of alkyl, substituted alkyl, cycloalkyl, substituted cycloalkyl, alkenyl, substituted alkenyl, alkynyl, substituted alkynyl, phenyl, substituted phenyl, phenylalkyl, substituted phenylalkyl, aryl, substituted aryl, arylalkyl, substituted arylalkyl, heteroarylalkyl, substituted heteroarylalkyl, heteroaryl and substituted heteroaryl, wherein R' and R" may be optionally covalently linked to form a cyclic structure with S. In other embodiments, L is an optionally substituted thiophene or tetrahydrothiophene. In yet other embodiments, L is an thioester, thioketone or thioaldehyde.

In certain embodiments, each of the 5-membered rings is unsubstituted at the 1, 2 and 3 positions, having only CH groups.

In certain embodiments, each occurrence of Z is independently selected from the group consisting of CH and CR, so the precatalyst of formula (II) is a substituted indenyl complex.

In certain embodiments, R is $C_1$-$C_6$ alkyl, which is optionally substituted. In other embodiments, R is $C_3$-$C_8$ cycloalkyl, which is optionally substituted. In yet other embodiments, R is $C_2$-$C_6$ alkenyl, which is optionally substituted. In yet other embodiments, R is $C_2$-$C_6$ alkynyl, which is optionally substituted. In yet other embodiments, R is phenyl, which is optionally substituted. In yet other embodiments, R is phenylalkyl, which is optionally substituted. In yet other embodiments, R is aryl (such as naphthyl, for example), which is optionally substituted. In yet other embodiments, R is arylalkyl, which is optionally substituted. In yet other embodiments, R is heteroarylalkyl, which is optionally substituted. In yet other embodiments, R is heteroaryl, which is optionally substituted.

In certain embodiments, each occurrence of alkyl, alkenyl, alkynyl, or cycloalkyl is independently optionally substituted with at least one substituent selected from the group consisting of $C_1$-$C_6$ alkyl, halo, —OR", phenyl (thus yielding, in non-limiting examples, optionally substituted phenyl-($C_1$-$C_3$ alkyl), such as, but not limited to, benzyl or substituted benzyl) and —N(R")(R"), wherein each occurrence of R" is independently H, $C_1$-$C_6$ alkyl or $C_3$-$C_8$ cycloalkyl.

In certain embodiments, each occurrence of phenyl, aryl, phenylalkyl, arylalkyl, heteroaryl, and heteroarylalkyl is independently optionally substituted with at least one substituent selected from the group consisting of $C_1$-$C_6$ alkyl, $C_1$-$C_6$ haloalkyl, $C_1$-$C_6$ haloalkoxy, halo, —CN, —OR", —N(R")(R"), —NO$_2$, —S(=O)$_2$N(R")(R"), acyl, and $C_1$-$C_6$ alkoxycarbonyl, wherein each occurrence of R" is independently H, $C_1$-$C_6$ alkyl or $C_3$-$C_8$ cycloalkyl.

In certain embodiments, each occurrence of phenyl, aryl, phenylalkyl, arylalkyl, heteroaryl, and heteroarylalkyl is independently optionally substituted with at least one substituent selected from the group consisting of $C_1$-$C_6$ alkyl, $C_1$-$C_6$ haloalkyl, $C_1$-$C_6$ haloalkoxy, halo, —CN, —OR", —N(R")(R"), and $C_1$-$C_6$ alkoxycarbonyl, wherein each occurrence of R" is independently H, $C_1$-$C_6$ alkyl or $C_3$-$C_8$ cycloalkyl.

The precatalysts of the invention may possess one or more stereocenters, and each stereocenter may exist independently in either the (R) or (S) configuration. In certain embodiments, precatalysts described herein are present in optically active or racemic forms.

The precatalysts described herein encompass racemic, optically-active, regioisomeric and stereoisomeric forms, or combinations thereof that possess the therapeutically useful properties described herein. Preparation of optically active forms is achieved in any suitable manner, including by way of non-limiting example, by resolution of the racemic form with recrystallization techniques, synthesis from optically-active starting materials, chiral synthesis, or chromatographic separation using a chiral stationary phase.

In certain embodiments, the precatalysts of the invention exist as tautomers. All tautomers are included within the scope of the precatalysts recited herein.

Compounds described herein also include isotopically-labeled compounds wherein one or more atoms is replaced by an atom having the same atomic number, but an atomic mass or mass number different from the atomic mass or mass number usually found in nature.

Examples of isotopes suitable for inclusion in the compounds described herein include and are not limited to $^2$H, $^3$H, $^{11}$C, $^{13}$C, $^{14}$C, $^{36}$Cl, $^{18}$F, $^{123}$I, $^{125}$I, $^{13}$N, $^1$N, $^{15}$O, $^{17}$O, $^{18}$O, $^{32}$P, and $^{35}$S. In certain embodiments, substitution with heavier isotopes such as deuterium affords greater chemical stability. Isotopically-labeled compounds are prepared by any suitable method or by processes using an appropriate isotopically-labeled reagent in place of the non-labeled reagent otherwise employed.

In certain embodiments, the precatalysts described herein are labeled by other means, including, but not limited to, the use of chromophores or fluorescent moieties, bioluminescent labels, or chemiluminescent labels.

Synthesis

The precatalysts described herein, and other related precatalysts having different substituents are synthesized using techniques and materials described herein and as described, for example, in Fieser & Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991), Larock's Comprehensive Organic Transformations (VCH Publishers Inc., 1989), March, Advanced Organic Chemistry 4$^{th}$ Ed., (Wiley 1992); Carey & Sundberg, Advanced Organic Chemistry 4th Ed., Vols. A and B (Plenum 2000, 2001), and Green & Wuts, Protective Groups in Organic Synthesis 3rd Ed., (Wiley 1999) (all of which are incorporated by reference for such disclosure).

Precatalysts described herein are synthesized using any suitable procedures starting from compounds that are available from commercial sources, or are prepared using procedures described herein. Modifications of these procedures are known to those skilled in the art. The scheme included herein are intended to illustrate but not limit the chemistry and methodologies that one skilled in the art may use to make precatalysts of the invention.

The invention further provides novel synthetic methods of preparing precatalysts of formula (I) and formula (II).

In certain embodiments, the synthesis of the precatalyst of formula (I) can be performed under aerobic conditions, without the use of air sensitive reagents. In certain embodiments, the synthesis of the precatalyst of formula (II) can be performed under aerobic conditions, without the use of air sensitive reagents.

In certain embodiments, a transition metal salt (such as, but not limited to, a halide, triflate, mesylate or tosylate) is reacted with an alkaline or alkaline-earth salt to yield a mixed salt, such as but not limited to $Na_2PdCl_4$. The mixed salt can be reacted with unsubstituted indene and a base (such as, but not limited to, cesium, potassium or sodium carbonate or the analogous bicarbonate salts) in an organic solvent (such as, but not limited to, methanol, ethanol, isopropanol, tetrahydrofuran, and/or 1,4-dioxane). The mixture can be stirred at a temperature ranging from about −20° C. to about 80° C. In certain embodiments, the resulting complex precipitates out of solution, and is isolated and optionally purified by washing, recrystallization and/or extraction. In other embodiments, the resulting complex is isolated from solution using a method such as chromatography, precipitation, crystallization and/or extraction. In certain embodiments, if the transition metal salt used is a triflate (or any other perfluoroalkanesulfonate or a partially fluorinated alkanesulfonate), the resulting complex can be in certain instances a precatalyst of formula (I). In other embodiments, if the transition metal salt used is not triflate (or any other perfluoroalkanesulfonate or a partially fluorinated alkanesulfonate), a precatalyst of formula (I) can be generated by reacting the resulting complex with a triflate salt triflate (or any other perfluoroalkanesulfonate or a partially fluorinated alkanesulfonate), such as, but not limited to silver triflate, thereby exchanging the anions bound to the transition metal with triflates.

In certain embodiments, the synthesis of the precatalyst of formula (I) is amenable to large scale reactions. In other embodiments, the synthesis of the precatalyst of formula (I) can be carried out on the gram-scale (i.e., 1 g to about 100 g of isolable product per reaction).

In certain embodiments, the synthesis of the precatalyst of formula (II) comprises reacting a precatalyst of formula (I) with an appropriate ligand L, in an organic solvent such as, but not limited to, acetonitrile, diethyl ether, tetrahydrofuran, and/or 1,4-dioxane.

In certain embodiments, L is not a monodentate phosphine ligand. In other embodiments, L is not a monodentate phosphine ligand of formula $PR^*_3$, wherein each occurrence of $R^*$ is independently selected from the group consisting of phenyl, cyclohexyl, methyl and methoxy.

In certain embodiments, L is selected from the group consisting of optionally substituted 1,3-dihydro-2H-imidazol-2-ylidene, optionally substituted 1,3,4,5-tetrahydro-2H-imidazol-2-ylidene, and optionally substituted 1,2,4-triazol-5-ylidene. In other embodiments, L is 1,3-bis(2,6-diisopropylphenyl)-1,3-dihydro-2H-imidazol-2-ylidene.

In certain embodiments, L is at least one selected from the group consisting of AmPhos (di-t-butylphosphino-4-dimethylaminobenzene), DavePhos (2-dicyclohexylphosphino-2'-(N,N-dimethylamino)biphenyl), $^{tBu}$DavePhos (2-Di-tert-butylphosphino-2'-(N,N-dimethylamino)biphenyl), QPhos (1,2,3,4,5-pentaphenyl-1'-(di-tert-butylphosphino)ferrocene), RuPhos (2-dicyclohexylphosphino-2',6'-diisopropoxybiphenyl), SPhos (2-dicyclohexylphosphino-2',6'-dimethoxybiphenyl), XPhos (2-dicyclohexylphosphino-2',4',6'-triisopropylbiphenyl), $^{tBu}$XPhos (2-Di-tert-butylphosphino-2',4',6'-triisopropylbiphenyl), $^{Me4tBu}$XPhos (2-Di-tert-butylphosphino-3,4,5,6-tetramethyl-2',4',6'-triisopropyl-1,1'-biphenyl), BrettPhos (2-(Dicyclohexylphosphino)3,6-dimethoxy-2',4',6'-triisopropyl-1,1'-biphenyl), $^{tBu}$BrettPhos (2-(Di-tert-butylphosphino)-2',4',6'-triisopropyl-3,6-dimethoxy-1,1'-biphenyl), $^{Ad}$BrettPhos (2-(Diadamantylphosphino)-2',4',6'-triisopropyl-3,6-dimethoxy-1,1'-biphenyl), Me-DalPhos (2-(Di-1-adamantylphosphino)phenylpiperidine), Mor-DalPhos (Di(1-adamantyl)-2-morpholinophenylphosphine), Di(1-adamantyl)-1-piperidinylphenylphosphine, RockPhos (2-Di(tert-butyl)phosphino-2',4',6'-triisopropyl-3-methoxy-6-methylbiphenyl), AlPhos (Di-1-adamantyl(4''-butyl-2'',3'',5'',6''-tetrafluoro-2',4',6'-triisopropyl-2-methoxy-meta-terphenyl)phosphine), PipDalPhos (1-(2-(di((3S,5S,7S)-adamantan-1-yl)phosphanyl)phenyl)piperidine), TrippyPhos (1-[2-[Bis(tert-butyl)phosphino]phenyl]-3,5-diphenyl-1H-pyrazole) and BippyPhos (5-(Di-tert-butylphosphino)-1',3',5'-triphenyl-1'H-[1,4']bipyrazole).

In certain embodiments, L is a monodentate phosphine ligand. In other embodiments, L is selected from the group consisting of triphenylphosphine, tri(o-tolyl) phosphine, tricyclohexylphosphine, tri(t-butyl)phosphine, trimethylphosphine, trimethoxyphosphine, $PAd_3$ (Ad=admantyl), trinaphthlphosphine, tri(pentafluorophenyl)phosphine, Diphenyl-2-pyridylphosphine, tri(2-furyl)phosphine, tri(n-octyl) phosphine and dimethylphenylphosphine.

In certain embodiments, L is a bidentate phosphine ligand. In other embodiments, L is selected from the group consisting of 1,1'-bis(diphenylphosphino) ferrocene (DPPF), 4,5-bis(diphenylphosphino)-9,9-dimethylxanthene (XantPhos), 4,6-bis (diphenylphosphanyl)-10H-phenoxazine (NiXantPhos), 1,2-bis(diphenylphosphino)ethane (dppe), 1,1-bis(diphenylphosphino)methane (dppm), 1,3-bis(diphenylphosphino)propane (dppp), 1,4-bis(diphenylphosphino)butane (dppb), 2,2'-bis(diphenylphosphino)-1,1'-binaphthyl (BINAP), bis[(2-diphenylphosphino)phenyl] ether (DPEPhos), 1,2-bis(dichlorophosphino) ethane, and 1,2-bis(dicyclohexylphosphino)-ethane (dcpe).

In certain embodiments, L is NR'R''R''', wherein R'', R'' and R''' are independently selected from the group consisting of alkyl, substituted alkyl, cycloalkyl, substituted cycloalkyl, alkenyl, substituted alkenyl, alkynyl, substituted alkynyl, phenyl, substituted phenyl, phenylalkyl, substituted phenylalkyl, aryl, substituted aryl, arylalkyl, substituted arylalkyl, heteroarylalkyl, substituted heteroarylalkyl, heteroaryl and substituted heteroaryl, wherein two or three R substituents may be optionally covalently linked to form a cyclic structure with N.

In certain embodiments, L is R'OR'', wherein R'' and R'' are independently selected from the group consisting of alkyl, substituted alkyl, cycloalkyl, substituted cycloalkyl, alkenyl, substituted alkenyl, alkynyl, substituted alkynyl, phenyl, substituted phenyl, phenylalkyl, substituted phenylalkyl, aryl, substituted aryl, arylalkyl, substituted arylalkyl, heteroarylalkyl, substituted heteroarylalkyl, heteroaryl and substituted heteroaryl, wherein R' and R'' may be optionally covalently linked to form a cyclic structure with O. In other embodiments, L is an optionally substituted furan or tetrahydrofuran. In yet other embodiments, L is an ester, ketone or aldehyde.

In certain embodiments, L is R'SR'', wherein R'' and R'' are independently selected from the group consisting of alkyl, substituted alkyl, cycloalkyl, substituted cycloalkyl, alkenyl, substituted alkenyl, alkynyl, substituted alkynyl, phenyl, substituted phenyl, phenylalkyl, substituted phenylalkyl, aryl, substituted aryl, arylalkyl, substituted arylalkyl, heteroarylalkyl, substituted heteroarylalkyl, heteroaryl and substituted heteroaryl, wherein R' and R'' may be optionally covalently linked to form a cyclic structure with S. In other embodiments, L is an optionally substituted thiophene or tetrahydrothiophene. In yet other embodiments, L is an thioester, thioketone or thioaldehyde.

The invention further provides methods of synthesizing precatalysts of formula (II) directly from ($\eta^3$-indenyl)$_2$($\mu$-Cl)$_2$Pd$_2$ in a one-pot synthesis. In one embodiment, ($\eta^3$-indenyl)$_2$($\mu$-Cl)$_2$Pd$_2$ is simultaneously reacted with a metal triflate (or a partially fluorinated alkanesulfonate or any other perfluoroalkane sulfonate), such as, but not limited to, silver triflate, and a ligand L in an organic solvent (such as, but not limited to, tetrahydrofuran, methanol, ethanol, iso-propanol, acetonitrile, and/or 1,4-dioxane). The mixture is stirred at a temperature ranging from about −20° C. to about 80° C. In certain embodiments, the reaction is purified by filtration of the metal chloride salt. In certain embodiments, the resulting complex precipitates out of solution, and is isolated and optionally purified by washing, recrystallization and/or extraction. In other embodiments, the resulting complex is isolated from solution using a method such as, but not limited to, chromatography, precipitation, crystallization and/or extraction.

Methods

The precatalyst of formula (I) or (II) can be used in coupling reactions to promote formation of a carbon-carbon, carbon-oxygen, carbon-nitrogen, and/or carbon-sulfur bond(s).

In certain embodiments, the precatalyst of formula (I) or (II) can be used to promote the reactions depicted in FIG. 1.

In certain embodiments, the precatalyst of formula (I) or (II) is used to promote the coupling of an aromatic or heteroaromatic boronic acid or ester with an aromatic or heteroaromatic halide, tosylate, triflate, mesylate, sulfamate, carbamate, carbonate, ester or amide (Suzuki-Miyaura reaction).

In certain embodiments, the precatalyst of formula (I) or (II) is used to promote the coupling of an aromatic or heteroaromatic amine with an aromatic, heteroaromatic or vinylic halide, tosylate, triflate, mesylate, sulfamate or carbamate (Buchwald-Hartwig reaction).

In certain embodiments, the precatalyst of formula (I) or (II) is used to promote the coupling of an aromatic or heteroaromatic zinc halide with an aromatic, heteroaromatic or vinylic halide, tosylate, triflate, mesylate, sulfamate or carbamate (Negishi reaction).

In certain embodiments, the precatalyst of formula (I) or (II) is used to promote the coupling of an aromatic or heteroaromatic magnesium halide with an aromatic, heteroaromatic or vinylic halide, tosylate, triflate, mesylate, sulfamate or carbamate (Kumada reaction).

In certain embodiments, the precatalyst of formula (I) or (II) is used to promote the coupling of an aromatic or heteroaromatic tin halide with an aromatic, heteroaromatic or vinylic halide, tosylate, triflate, mesylate, sulfamate or carbamate (Stille reaction).

In certain embodiments, the precatalyst of formula (I) or (II) is used to promote the α-arylation of a ketone, aldehyde, imine, amide or ester with an aromatic, heteroaromatic or vinylic halide, tosylate, triflate, mesylate, sulfamate or carbamate (α-arylation reaction).

In certain embodiments, the precatalyst of formula (I) or (II) is used to promote the reaction of an alcohol or thiol with an aromatic, heteroaromatic or vinylic halide, tosylate, triflate, mesylate, sulfamate or carbamate (C—S or C—O bond formation).

In certain embodiments, the precatalyst of formula (I) or (II) is used to promote the reaction of an aromatic or heteroaromatic silanol, siloxane or silane with an aromatic, heteroaromatic or vinylic halide, tosylate, triflate or mesylate (Hiyama coupling).

In certain embodiments, the precatalyst of formula (I) or (II) is used to promote the anaerobic oxidation of a primary or secondary alcohol.

Those skilled in the art will recognize, or be able to ascertain using no more than routine experimentation, numerous equivalents to the specific procedures, embodiments, claims, and examples described herein. Such equivalents were considered to be within the scope of this invention and covered by the claims appended hereto. For example, it should be understood, that modifications in reaction conditions, including but not limited to reaction times, reaction size/volume, and experimental reagents, such as solvents, catalysts, pressures, atmospheric conditions, e.g., nitrogen atmosphere, and reducing/oxidizing agents, with art-recognized alternatives and using no more than routine experimentation, are within the scope of the present application.

It is to be understood that, wherever values and ranges are provided herein, the description in range format is merely for convenience and brevity and should not be construed as an inflexible limitation on the scope of the invention. Accordingly, all values and ranges encompassed by these values and ranges are meant to be encompassed within the scope of the present invention. Moreover, all values that fall within these ranges, as well as the upper or lower limits of a range of values, are also contemplated by the present application. The description of a range should be considered to have specifically disclosed all the possible sub-ranges as well as individual numerical values within that range and, when appropriate, partial integers of the numerical values within ranges. For example, description of a range such as from 1 to 6 should be considered to have specifically disclosed sub-ranges such as from 1 to 3, from 1 to 4, from 1 to 5, from 2 to 4, from 2 to 6, from 3 to 6, and so on, as well as individual numbers within that range, for example, 1, 2, 2.7, 3, 4, 5, 5.3, and 6. This applies regardless of the breadth of the range.

The following examples further illustrate aspects of the present invention. However, they are in no way a limitation of the teachings or disclosure of the present invention as set forth herein.

EXAMPLES

The invention is now described with reference to the following Examples. These Examples are provided for the purpose of illustration only, and the invention is not limited to these Examples, but rather encompasses all variations that are evident as a result of the teachings provided herein.

Materials & Methods

Materials

Unless otherwise noted, all starting materials were obtained from commercial suppliers and used without purification.

Pentane, THF, diethyl ether and toluene were dried by passage through a column of activated alumina followed by storage under dinitrogen. All commercial chemicals were used as received except where noted. MeOH (J. T. Baker), $^i$PrOH (Macron Fine Chemicals), and 200 proof EtOH (Decon Laboratories Inc.) were not dried, but were degassed by sparging with dinitrogen for 1 hour and stored under dinitrogen. Ethyl acetate (Fisher Scientific) and hexanes (Macron Fine Chemicals) were used as received. Potassium tert-butoxide (99.99%, sublimed), naphthalene (99%), 4-chlorotoluene (98%) and 4-chloroanisole (99%) were purchased from Aldrich. 2,6-dimethylboronic acid (98%), 1-naphthaleneboronic acid (97%), 1-chloronaphthalene (90+%) and 2-methoxyboronic acid (97%) were purchased from Fisher Scientific. Potassium carbonate was purchased from Mallinckrodt. 1,3-divinyltetramethyldisiloxane and 4-methylbiphenyl were purchased from TCI.

Phenylboronic acid (98%) and 2,4,6-trimethylbenzeneboronic acid (97%) were purchased from Alfa Aesar. Potassium carbonate was ground up with a mortar and pestle and stored in an oven at 130° C. prior to use. 4-chlorotoluene, 2-chloro-m-xylene, 1-chloronaphthalene, 4-chloroanisole and 1,3-divinyltetramethyldisiloxane were degassed prior to use through three freeze-pump-thaw cycles.

Deuterated solvents were obtained from Cambridge Isotope Laboratories. $C_6D_6$ was dried over sodium metal and stored under nitrogen, while $d_4$-MeOH, $d_8$-$^i$PrOH, and $d_8$-THF were not dried but were degassed prior to use through three freeze-pump-thaw cycles.

Literature procedures were used to prepare the following compounds: IPr (Arduengo, et al., 1999, Tetrahedron 55:14523; Tang, et al., 2011, J. Am. Chem. Soc. 133:11482).

Methods

Experiments were performed under a dinitrogen atmosphere in an M-Braun dry box or using standard Schlenk techniques unless otherwise stated. Under standard glovebox conditions purging was not performed between uses of pentane, benzene and toluene; thus when any of these solvents were used, traces of all these solvents were in the atmosphere and could be found intermixed in the solvent bottles. Moisture- and air-sensitive liquids were transferred by stainless steel cannula on a Schlenk line or in a dry box.

Flash chromatography was performed on silica gel 60 (230-400 mesh, Fisher Scientific).

NMR spectra were recorded on Agilent-400, -500 and -600 spectrometers and Varian-300 or Varian-500 spectrometers at ambient probe temperatures unless noted. For variable temperature NMR, the sample temperature was calibrated by measuring the distance between the OH and $CH_2$ resonances in ethylene glycol (99%, Aldrich). Chemical shifts are reported with respect to residual internal protio solvent for $^1H$ and $^{13}C\{^1H\}$ NMR spectra.

Gas chromatography analyses (GC) were performed on a Shimadzu GC-2010 Plus apparatus equipped with a flame ionization detector and a Shimadzu SHRXI-5MS column (30 m, 250 μm inner diameter, film: 0.25 μm). The following conditions were utilized for GC analyses: flow rate 1.23 mL/min constant flow, column temperature 50° C. (held for 5 min), 20° C./min increase to 300° C. (held for 5 min), total time 22.5 min.

High resolution mass spectrometry was performed using an ion-cyclotron resonance (ICR) mass spectrometer equipped with a superconducting (7T) magnet.

X-Ray Crystallography:

X-ray diffraction experiments were carried out on either a Rigaku Mercury 275R CCD (SCX mini) diffractometer using graphite-monochromated Mo Kα radiation (1=0.71073 Å) at −50° C. or a Rigaku MicroMax-007HF diffractometer coupled to a Saturn994+ CCD detector with Cu Kα radiation (λ=1.54178 Å) at −180° C. The crystals were mounted on MiTeGen polyimide loops with immersion oil. The data frames were processed using Rigaku CrystalClear and corrected for Lorentz and polarization effects.

Using Olex2, the structure was solved with the XS structure solution program using direct methods and refined with the XL refinement package using least squares minimisation. The non-hydrogen atoms were refined anisotropically. Hydrogen atoms were refined using the riding model.

Example 1: Synthesis and Characterization

Synthetic Procedures for Complexes:

$(\eta^3$-indenyl$)_2(\mu$-Cl$)Pd_2$ (3a):

$PdCl_2$ (1.00 g, 5.64 mmol) and NaCl (0.658 g, 11.3 mmol) were added to a 250 mL round bottom flask. MeOH (70 mL) was added and the reaction mixture heated at 50° C. for 30 minutes, at which time it became homogeneous. The solution was allowed to cool to room temperature. Indene (0.650 g, 5.64 mmol) was added, followed by $Na_2CO_3$ (0.888 g, 8.46 mmol) and the reaction stirred for 2 hours at room temperature. The reaction mixture was filtered and the resulting brown solid washed with water and diethyl ether. The product was dried under vacuum to yield 3a as a brown solid. Yield: 1.22 g, 84%. The $^1H$ NMR data was consistent with that published in the literature (Sui-Seng, et al., 2004, Organomet. 23:1236)

$(\eta^3$-indenyl$)_2(\mu$-OTf$)_2Pd_2$ (3a-OTf):

$[(\eta^3$-Indenyl$)Pd(\mu$-Cl$)]_2$ (0.10 g, 0.195 mmol) and AgOTf (0.10 g, 0.39 mmol) were added to a 100 mL round bottom flask. Acetonitrile (10 mL) was added and the reaction was stirred for 30 minutes at room temperature. At this time, the reaction mixture was filtered through celite to remove AgCl precipitate to yield a dark red homogeneous solution. The solvent was removed under reduced pressure and the brown oil was titrated in pentane to yield a brown solid. Yield: 0.127 g, 88%. $^1H$ NMR ($CD_3OD$, 400 MHz): 7.07-7.03 (m, 6H), 6.97-6.94 (m, 4H), 6.23 (d, J=5.5 Hz, 4H) ppm. $^{13}C\{^1H\}$ ($CD_3OD$, 125 MHz): 140.16, 130.07, 123.05, 114.12, 80.93 ppm. $^{19}F$ ($CD_3OD$, 471 MHz): −80.17 ppm.

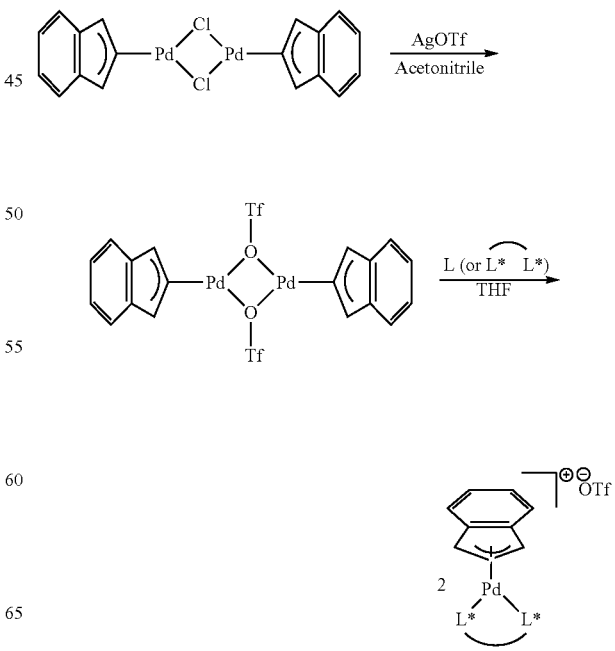

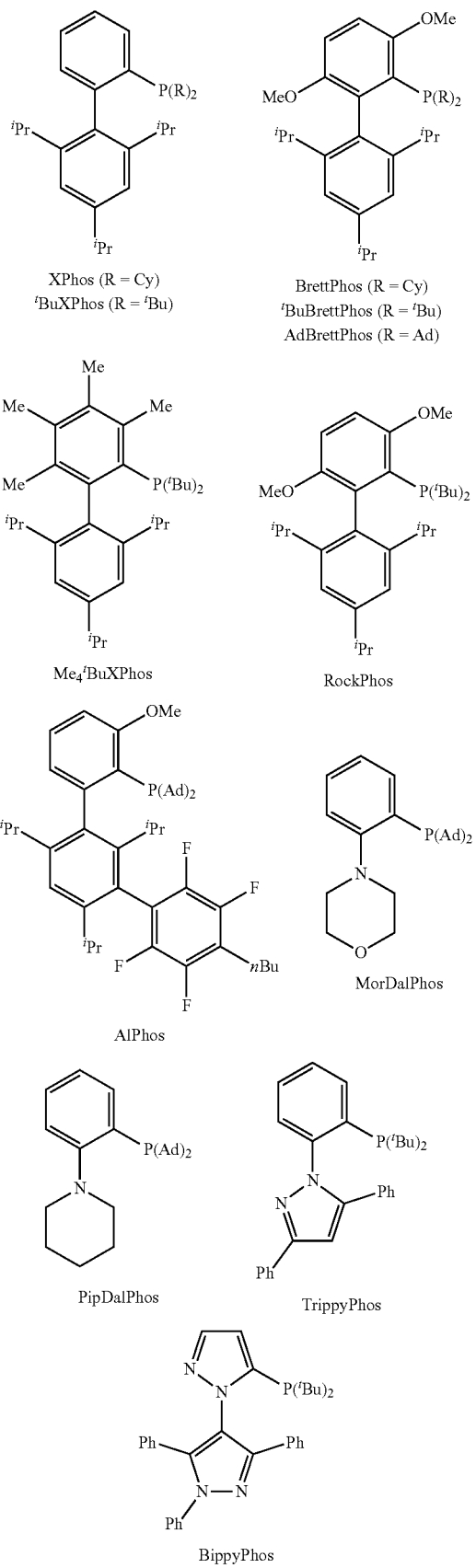

($\eta^3$-Indenyl)Pd(XPhos)(OTf)

[($\eta^3$-Indenyl)Pd(μ-OTf)]$_2$ (0.10 g, 0.135 mmol) and XPhos (0.128 g, 0.270 mmol) were added to a 20 mL vial equipped with a flea stir bar. THF (10 mL) was added to the vial and a red homogenous mixture was observed. The mixture was stirred for one hour at room temperature, at which time the solvent was removed under reduced pressure. The red oil was titrated with pentane to yield a dark red solid. Yield: 0.185 g, 81%. $^1$H NMR (CDCl$_3$, 500 MHz): 7.69 (t, J=6.5 Hz, 1H), 7.53-7.50 (m, 2H), 7.44 (t, J=6.5 Hz, 1H), 7.29 (d, J=7.0 Hz, 1H), 7.20 (s, 1H), 7.09 (t, J=6.9 Hz, 1H), 6.98 (t, J=6.8 Hz, 1H), 6.83 (d, J=6.8 Hz, 1H), 6.71 (dd, J=6.9, 2.1 Hz, 1H), 6.62 (s, 1H), 6.25 (s, 1H), 4.59 (d, J=6.5 Hz, 1H), 3.17 (sept, J=6.6 Hz, 1H), 2.56-1.94 (m, 8H), 1.69-1.15 (m, 23H), 0.86 (d, J=6.6 Hz, 3H), 0.77 (d, J=6.6 Hz. 3H), 0.55 (d, J=6.5 Hz, 3H) ppm. $^{13}$C{$^1$H} NMR (126 MHz, CDCl$_3$): 152.22, 150.18, 146.06, 144.92, 144.76, 138.57, 134.55, 132.84, 132.53, 132.19, 132.08, 131.98, 131.75, 129.25, 128.80, 127.50, 126.28, 125.57, 120.75, 119.28, 118.02, 116.92, 116.75, 113.55, 113.50, 70.68, 67.95, 37.55, 37.35, 37.30, 37.12, 34.18, 32.30, 31.88, 30.30, 30.02, 29.29, 28.15, 26.93, 26.84, 26.68, 26.58, 26.49, 25.84, 25.74, 25.41, 24.85, 24.54, 23.84, 23.38 ppm. $^{31}$P{$^1$H} NMR (CDCl$_3$ 100 MHz): 53.69 ppm. $^{19}$F NMR (471 MHz, CDCl$_3$): −77.97 ppm.

($\eta^3$-Indenyl)Pd(BuXPhos)(OTf)

[($\eta^3$-Indenyl)Pd(μ-OTf)]$_2$ (0.10 g, 0.135 mmol) and $^t$BuXPhos (0.115 g, 0.270 mmol) were added to a 20 mL vial equipped with a flea stir bar. THF (10 mL) was added to the vial and a red homogenous mixture was observed. The mixture was stirred for one hour at room temperature, at which time the solvent was removed under reduced pressure. The red oil was titrated with pentane to yield a dark red solid. Yield: 0.197 g, 92%. $^1$H NMR (CDCl$_3$, 500 MHz): 7.83 (t, J=5.9 Hz, 1H), 7.52-7.49 (m, 2H), 7.43 (t, J=5.7 Hz, 1H), 7.21 (s, 1H), 7.14 (d, J=5.5 Hz, 1H), 7.05 (t, J=6.0 Hz, 1H), 6.97 (d, J=6.7 Hz, 1H), 6.77-6.73 (m, 2H), 6.65 (dd, J=6.0, 3.1 Hz, 1H), 6.40 (s, 1H), 4.35 (d, 5.6 Hz, 1H), 3.20 (sept, J=6.5 Hz, 1H), 2.26 (sept, J=6.4 Hz, 1H), 2.18 (sept, J=6.5 Hz, 1H), 1.54-1.47 (m, 9H), 1.45 (d, J=5.7 Hz, 9H), 1.41 (d, J=5.6 Hz, 9H), 0.83-0.79 (m, 6H), 0.59 (d, J=5.4 Hz, 3H) ppm. $^{13}$C{$^1$H} NMR (101 MHz, CDCl$_3$): 153.18, 148.57, 145.52, 145.32, 135.72, 134.25, 133.10, 132.99, 131.51, 129.61, 128.16, 127.96, 126.68, 126.07, 122.34, 121.45, 119.36, 116.82, 116.60, 114.60, 34.22, 32.13, 32.05, 31.22, 31.17, 30.41, 30.36, 27.89, 26.11, 25.50, 25.22, 24.77, 23.65, 23.24 ppm. $^{31}$P{$^1$H} NMR (CDCl$_3$ 100 MHz): 82.57 ppm. $^{19}$F NMR (376 MHz, CDCl$_3$): −77.92 ppm.

($\eta^3$-Indenyl)Pd(BrettPhos)(OTf)

[($\eta^3$-Indenyl)Pd(μ-OTf)]$_2$ (0.10 g, 0.135 mmol) and BrettPhos (0.145 g, 0.270 mmol) were added to a 20 mL vial equipped with a flea stir bar. THF (10 mL) was added to the vial and a red homogenous mixture was observed. The mixture was stirred for one hour at room temperature, at which time the solvent was removed under reduced pressure. The red oil was titrated with pentane to yield a dark red solid. Yield: 0.220 g, 90%. $^1$H NMR (CDCl$_3$, 500 MHz): 7.44 (s, 1H), 7.16-6.93 (m, 7H), 6.82 (d, J=6.5 Hz, 1H), 6.63 (s, 1H), 6.06 (s, 1H), 4.17 (d, 5.4 Hz, 1H), 3.92 (s, 3H), 3.33 (s, 3H), 3.15 (sept, J=5.6 Hz, 1H), 2.79 (q, J=5.7 Hz, 1H), 2.56 (q, J=5.7 Hz, 1H), 2.27-1.67 (m, 16H), 1.54-0.81 (m, 20H), 0.69 (d, J=6.1 Hz, 3H), 0.45 (d, J=6.2 Hz, 3H) ppm. $^{13}$C{$^1$H} NMR (126 MHz, CDCl$_3$): 154.85, 154.17, 153.51, 151.21, 151.08, 150.96, 139.93, 139.89, 135.74, 135.33, 134.74, 134.58, 129.16, 127.13, 125.74, 125.47, 124.60, 122.89, 122.59, 120.93, 119.38, 116.60, 116.43, 115.46, 114.21, 114.16, 112.88, 112.84, 109.62, 109.58, 70.76, 67.95, 56.04, 54.71, 39.16, 38.98, 38.71, 38.51, 34.38, 34.19, 32.77, 32.21, 31.94, 30.53, 30.51, 30.30, 29.79, 29.24, 27.35, 27.25, 27.09, 26.99, 26.87, 26.79, 26.75, 26.67, 26.42, 25.83, 24.93, 24.61, 24.31, 24.16, 23.85 ppm. $^{31}$P{$^1$H} NMR (CDCl$_3$ 100 MHz): 58.19 ppm. $^{19}$F NMR (471 MHz, CDCl$_3$): −78.01 ppm.

($\eta^3$-Indenyl)Pd($^t$BuBrettPhos)(OTf)

[($\eta^3$-Indenyl)Pd($\mu$-OTf)]$_2$ (0.10 g, 0.135 mmol) and $^t$Bu-BrettPhos (0.131 g, 0.270 mmol) were added to a 20 mL vial equipped with a flea stir bar. THF (10 mL) was added to the vial and a red homogenous mixture was observed. The mixture was stirred for one hour at room temperature, at which time the solvent was removed under reduced pressure. The red oil was titrated with pentane to yield a dark red solid. Yield: 0.189 g, 82%. $^1$H NMR (CDCl$_3$, 500 MHz): 7.46 (s, 1H), 7.15 (s, 1H), 7.08 (d, J=7.1 Hz, 2H), 7.00 (t, J=5.6 Hz, 1H), 6.94 (t, J=5.7 Hz, 2H), 6.76 (d, J=6.0 Hz, 1H), 6.69 (t, J=4.1 Hz, 1H), 6.21 (s, 1H), 3.91 (d, J=5.5 Hz, 1H), 3.86 (s, 3H), 3.29 (s, 3H), 3.16 (sept, J=6.5 Hz, 1H), 2.35 (sept, J=6.5 Hz, 1H), 2.22 (sept, J=6.4 Hz, 1H), 1.52-1.46 (m, 9H), 1.43 (d, J=6.6 Hz, 9H), 1.39 (d, J=6.6 Hz, 9H), 0.77 (d, J=7.2 Hz, 3H), 0.74 (d, J=7.1 Hz, 3H), 0.53 (d, J=7.2 Hz, 3H) ppm. $^{13}$C{$^1$H} NMR (126 MHz, CDCl$_3$): 159.07, 154.32, 153.86, 152.80, 151.01, 150.88, 140.27, 136.63, 135.79, 129.23, 127.66, 126.04, 125.15, 124.37, 121.25, 119.44, 116.26, 116.08, 115.81, 115.76, 115.52, 112.88, 107.62, 54.72, 54.53, 40.99, 40.89, 40.24, 40.12, 34.49, 32.24, 32.15, 31.95, 31.91, 31.30, 31.26, 26.44, 24.97, 24.68, 24.53, 24.39, 23.90 ppm. $^{31}$P{$^1$H} NMR (CDCl$_3$ 100 MHz): 98.34 ppm. $^{19}$F NMR (471 MHz, CDCl$_3$): −77.93 ppm.

($\eta^3$-Indenyl)Pd(AdBrettPhos) (OTf)

[($\eta^3$-Indenyl)Pd($\mu$-OTf)]$_2$ (0.10 g, 0.135 mmol) and AdBrettPhos (0.173 g, 0.270 mmol) were added to a 20 mL vial equipped with a flea stir bar. THF (10 mL) was added to the vial and a red homogenous mixture was observed. The mixture was stirred for one hour at room temperature, at which time the solvent was removed under reduced pressure. The red oil was titrated with pentane to yield a dark red solid. Yield: 0.232 g, 85%. $^1$H NMR (CDCl$_3$, 500 MHz): 7.42 (s, 1H), 7.18-7.15 (m, 2H), 7.10 (d, J=7.1 Hz, 1H), 7.06 (t, J=6.6 Hz, 1H), 7.01 (d, J=7.1 Hz, 1H), 6.93 (t, J=6.5 Hz, 1H), 6.81 (d, J=7.0 Hz, 1H), 6.64 (t, J=4.4 Hz, 1H), 6.32 (s, 1H), 3.92 (s, 3H), 3.31 (s, 3H), 3.19 (sept, J=6.5 Hz, 1H), 2.35 (sept, J=6.5 Hz, 1H), 2.32 (sept, J=6.5 Hz, 1H), 2.22-2.00 (m, 16H), 1.77-1.47 (m, 23H), 0.82 (d, J=6.5 Hz, 3H), 0.70 (d, J=6.5 Hz, 3H), 0.60 (d, J=6.4 Hz, 3H) ppm. $^{13}$C{H} NMR (126 MHz, CDCl$_3$): 157.85, 157.05, 154.68, 153.75, 151.06, 150.94, 140.84, 140.79, 137.22, 136.09, 135.93, 129.32, 127.34, 126.74, 124.48, 121.20, 119.59, 115.66, 115.61, 115.43, 115.38, 115.19, 112.99, 112.96, 54.73, 54.56, 45.99, 45.90, 44.88, 44.80, 42.06, 41.49, 36.17, 35.99, 34.53, 32.24, 31.97, 30.30, 29.15, 29.08, 26.42, 24.97, 24.79, 24.76, 24.56, 23.80 ppm. $^{31}$P{$^1$H} NMR (CDCl$_3$ 100 MHz): 94.92 ppm. $^{19}$F NMR (471 MHz, CDCl$_3$): −77.95 ppm.

FIG. 5 reports the ORTEP of ($\eta^3$-Indenyl)Pd(AdBrettPhos)(OTf) precatalyst. Hydrogens have been removed for clarity.

($\eta^3$-Indenyl)Pd(Me$_4$$^t$BuPhos)(OTf)

[($\eta^3$-Indenyl)Pd($\mu$-OTf)]$_2$ (0.10 g, 0.135 mmol) and Me$_4$$^t$BuXPhos (0.130 g, 0.270 mmol) were added to a 20 mL vial equipped with a flea stir bar. THF (10 mL) was added to the vial and a red homogenous mixture was observed. The mixture was stirred for one hour at room temperature, at which time the solvent was removed under reduced pressure. The red oil was titrated with pentane to yield a dark red solid. Yield: 0.207 g, 90%. $^1$H NMR (CDCl$_3$, 500 MHz): 7.55 (s, 1H), 7.21 (s, 1H), 7.13 (d, J=5.9 Hz, 1H), 6.99 (d, J=5.8 Hz, 1H), 6.91 (t, J=6.7 Hz, 1H), 6.81 (t, J=4.4 Hz, 1H), 6.75 (d, J=5.6 Hz, 1H), 6.43 (s, 1H), 3.80 (d, J=5.6 Hz, 1H), 3.21 (sept, J=6.3 Hz, 1H), 2.57 (s, 3H), 2.42 (sept, J=6.3 Hz, 1H), 2.35 (sept, J=6.5 Hz, 1H), 2.26 (s, 6H), 2.12 (s, 3H), 1.55-1.49 (m, 18H), 0.83 (d, J=6.5 Hz, 3H), 0.76 (d, J=6.5 Hz, 6H), 0.51 (d, J=6.3 Hz, 3H) ppm. $^{13}$C{$^1$H} NMR (126 MHz, CDCl$_3$): 157.87, 154.42, 152.47, 141.52, 141.30, 141.25, 138.54, 138.46, 137.74, 136.44, 136.33, 132.68, 132.49, 129.17, 127.81, 126.46, 125.49, 124.98, 121.91, 119.50, 117.53, 117.48, 114.77, 114.58, 81.41, 81.38, 41.48, 41.42, 41.06, 40.98, 34.52, 33.15, 33.10, 32.81, 32.75, 32.67, 32.56, 26.94, 26.64, 25.26, 25.21, 24.79, 24.69, 24.01, 18.97, 17.41, 17.29 ppm. $^{31}$P{$^1$H}NMR (CDCl$_3$ 100 MHz): 106.47 ppm. $^{19}$F NMR (471 MHz, CDCl$_3$): −77.88 ppm.

($\eta^3$-Indenyl)Pd(RockPhos)(OTf)

[($\eta^3$-Indenyl)Pd($\mu$-OTf)]$_2$ (0.10 g, 0.135 mmol) and RockPhos (0.127 g, 0.270 mmol) were added to a 20 mL vial equipped with a flea stir bar. THF (10 mL) was added to the vial and a red homogenous mixture was observed. The mixture was stirred for one hour at room temperature, at which time the solvent was removed under reduced pressure. The red oil was titrated with pentane to yield a dark red solid. Yield: 0.181 g, 80%. $^1$H NMR (CDCl$_3$, 500 MHz): 7.56 (s, 1H), 7.30 (d, J=6.2 Hz, 1H), 7.23 (s, 1H), 7.11 (d, J=5.4 Hz, 1H), 7.03-6.91 (m, 3H), 6.79-6.73 (m, 2H), 6.30 (s, 1H), 3.99 (d, J=5.4 Hz, 1H), 3.90 (s, 3H), 3.20 (sept, J=6.2 Hz, 1H), 2.43 (sept, J=6.3 Hz, 1H), 2.33 (sept, J=6.2 Hz, 1H), 1.61-1.42 (m, 27H), 1.03 (s, 3H), 0.93 (d, J=6.5 Hz, 3H), 0.83 (d, J=6.4 Hz, 3H), 0.51 (d, J=6.5 Hz, 3H) ppm. $^{13}$C{$^1$H} NMR (126 MHz, CDCl$_3$): 159.13, 157.21, 154.49, 152.27, 140.80, 131.57, 129.39, 127.83, 126.51, 125.39, 121.57, 119.56, 116.86, 116.80, 115.45, 115.26, 111.98, 77.25, 54.60, 41.16, 41.05, 40.65, 40.53, 34.49, 32.33, 32.29, 32.14, 32.09, 31.68, 31.63, 27.76, 25.84, 25.10, 24.71, 24.63, 23.96, 19.21 ppm. $^{31}$P{$^1$H} NMR (CDCl$_3$ 100 MHz): 96.95 ppm. $^{19}$F NMR (471 MHz, CDCl$_3$): −77.92 ppm.

($\eta^3$-Indenyl)Pd(AlPhos)(OTf)

[($\eta^3$-Indenyl)Pd($\mu$-OTf)]$_2$ (0.10 g, 0.135 mmol) and AlPhos (0.220 g, 0.270 mmol) were added to a 20 mL vial equipped with a flea stir bar. THF (10 mL) was added to the vial and a red homogenous mixture was observed. The mixture was stirred for one hour at room temperature, at which time the solvent was removed under reduced pressure. The red oil was titrated with pentane to yield a dark red solid. Yield: 0.259 g, 81%. $^1$H NMR (CD$_3$OD, 500 MHz): 7.83 (s, 1H), 7.53 (t, J=6.5 Hz, 1H), 7.27 (d, J=5.6 Hz, 1H), 7.21-7.15 (m, 2H), 7.02 (t, J=6.4 Hz, 1H), 6.84 (s, 1H), 6.75 (s, 1H), 6.24 (d, J=5.5 Hz, 1H), 4.15 (d, J=4.5 Hz, 1H), 4.00 (s, 3H), 2.92-2.85 (m, 3H), 2.60 (sept, J=4.9 Hz, 1H), 2.46 (sept, J=5.0 Hz, 1H), 2.26-1.99 (m, 20H), 1.83-1.40 (m, 19H), 1.28-0.69 (m, 19H) ppm. $^{13}$C NMR (101 MHz, CDCl$_3$): 156.24, 151.87, 149.52, 145.37, 142.68, 142.50, 133.51, 129.29, 124.85, 123.44, 123.30, 121.76, 121.64, 116.76, 116.00, 106.81, 63.19, 50.18, 41.27, 41.15, 40.34, 40.25, 37.30, 36.86, 31.33, 28.40, 28.28, 26.36, 24.45, 24.36, 24.27 ppm. $^{31}$P{(H} NMR (CD$_3$OD 100 MHz): 93.15 ppm. $^{19}$F NMR (376 MHz, CDCl$_3$): −82.76, −140.45, −142.60, −147.39, −148.47 ppm.

($\eta^3$-Indenyl)Pd(MorDalPhos)(OTf)

[($\eta^3$-Indenyl)Pd($\mu$-OTf)]$_2$ (0.10 g, 0.135 mmol) and MorDalPhos (0.125 g, 0.270 mmol) were added to a 20 mL vial equipped with a flea stir bar. THF (10 mL) was added to the vial and a red homogenous mixture was observed. The mixture was stirred for one hour at room temperature, at which time the solvent was removed under reduced pressure. The red oil was titrated with pentane to yield a dark red solid. Yield: 0.203 g, 90%. $^1$H NMR (CDCl$_3$, 500 MHz): 7.89 (m, 1H), 7.82 (t, J=6.5 Hz, 1H), 7.71 (t, J=6.6 Hz, 1H), 7.52 (t, J=6.4 Hz, 1H), 7.31 (m, 2H), 7.19 (t, J=6.2 Hz, 1H), 7.08-6.99 (m, 3H), 6.19 (s, 1H), 4.54 (t, J=5.3 Hz, 1H), 4.21 (d, J=5.0 Hz, 1H), 3.95-3.82 (m, 2H), 3.28 (t, J=6.1 Hz, 2H), 3.04 (d, J=5.5 Hz, 1H), 2.46 (d, J=5.5 Hz, 1H), 2.27-1.92 (m, 15H), 1.78-1.55 (m, 15H) ppm. $^{13}$C{$^1$H}NMR (126 MHz, CDCl$_3$): 159.97, 159.87, 138.72, 137.41, 134.80, 134.09, 128.87, 128.48, 125.91, 125.76, 125.69, 125.36, 125.09, 121.18, 120.36, 112.79, 112.73, 106.15, 106.00, 67.96, 67.20, 66.60, 65.38, 64.67, 64.63, 60.37, 59.82, 44.17, 44.06, 42.96, 42.86, 41.96, 41.86, 41.52, 40.40, 37.04, 35.90, 35.82, 28.94, 28.88, 28.53, 28.45, 28.38, 28.30, 25.60 ppm. $^{31}$P{$^1$H} NMR (CDCl$_3$ 100 MHz): 85.45 ppm. $^{19}$F NMR (471 MHz, CDCl$_3$): −78.17 ppm.

(η$^3$-Indenyl)Pd(PipDalPhos)(OTf)

[(η$^3$-Indenyl)Pd(µ-OTf)]$_2$ (0.10 g, 0.135 mmol) and PipDalPhos (0.125 g, 0.270 mmol) were added to a 20 mL vial equipped with a flea stir bar. THF (10 mL) was added to the vial and a red homogenous mixture was observed. The mixture was stirred for one hour at room temperature, at which time the solvent was removed under reduced pressure. The red oil was titrated with pentane to yield a dark red solid. Yield: 0.213 g, 95%. $^1$H NMR (CDCl$_3$, 500 MHz): 8.04 (dd, J=5.4, 3.9 Hz, 1H), 7.73 (m, 2H), 7.47 (t, J=5.6 Hz, 1H), 7.30 (d, J=5.5 Hz, 2H), 7.18 (t, J=6.3 Hz, 1H), 7.02 (t, J=6.1 Hz, 1H), 6.87 (d, J=5.4 Hz, 1H), 6.82 (s, 1H), 6.08 (s, 1H), 3.09 (q, J=4.8 Hz, 2H), 2.85 (d, J=5.0 Hz, 1H), 2.58 (d, J=5.0 Hz, 1H), 2.22-1.92 (m, 18H), 1.76-1.55 (m, 18H) ppm. $^{13}$C{$^1$H} NMR (126 MHz, CDCl$_3$): 160.84, 160.72, 139.25, 137.81, 134.42, 134.18, 128.65, 128.23, 126.29, 126.23, 125.96, 124.59, 124.31, 121.14, 120.87, 111.63, 106.69, 106.54, 67.96, 63.46, 62.66, 61.09, 43.92, 43.81, 43.08, 42.98, 41.60, 40.34, 35.98, 35.81, 28.51, 28.39, 28.31, 26.18, 25.59, 25.49, 20.78 ppm. $^{31}$P{$^1$H} NMR (CDCl$_3$ 100 MHz): 86.45 ppm. $^{19}$F NMR (471 MHz, CDCl$_3$): −78.09 ppm.

(η$^3$-Indenyl)Pd(TrippyPhos)(OTf)

[(η$^3$-Indenyl)Pd(µ-OTf)]$_2$ (0.10 g, 0.135 mmol) and TrippyPhos (0.119 g, 0.270 mmol) were added to a 20 mL vial equipped with a flea stir bar. THF (10 mL) was added to the vial and a red homogenous mixture was observed. The mixture was stirred for one hour at room temperature, at which time the solvent was removed under reduced pressure. The red oil was titrated with pentane to yield a dark red solid. Yield: 0.175 g, 80%. $^1$H NMR (CDCl$_3$, 500 MHz): 8.08 (t, J=6.4 Hz, 1H), 7.85 (d, J=7.2 Hz, 2H), 7.68 (m, 3H), 7.49 (t, J=5.4 Hz, 1H), 7.43-7.39 (m, 3H), 7.22-7.18 (m, 3H), 6.99 (d, J=5.4 Hz, 1H), 6.83 (t, J=3.2 Hz, 2H), 6.68 (d, J=5.0H, 1H), 6.62 (dd, J=5.6, 2.3 Hz, 1H), 6.49 (t, J=4.3 Hz, 1H), 6.08 (s, 1H), 4.72 (d, J=6.0 Hz, 1H), 1.54 (d, 7.7 Hz, 9H), 1.45 (d, J=7.6 Hz, 9H) ppm. $^{13}$C{$^1$H} NMR (126 MHz, CDCl$_3$): 167.22, 154.70, 143.25, 136.80, 136.48, 134.86, 132.27, 131.83, 131.22, 130.62, 129.81, 129.50, 128.53, 128.38, 128.13, 127.87, 127.03, 120.65, 119.37, 118.95, 112.21, 112.17, 109.81, 103.10, 102.93, 38.84, 38.77, 38.74, 38.66, 31.50, 31.45, 29.58, 29.53 ppm. $^{31}$P{$^1$H} NMR (CDCl$_3$ 100 MHz): 67.63 ppm. $^{19}$F NMR (471 MHz, CDCl$_3$): −77.90 ppm.

Exemplary Alternative "One-Pot" Syntheses of Triflate Precatalysts

[(η$^3$-Indenyl)Pd(µ-Cl)]$_2$ (0.10 g, 0.195 mmol), AgOTf (0.10 g, 0.39 mmol) and XPhos (0.184 g, 0.39 mmol) were added to a 100 mL Schlenk flask. THF (10 mL) was added and the reaction was stirred for 30 minutes at room temperature. At this time, the reaction mixture was filtered through celite to remove AgCl precipitate to yield a red homogeneous solution. The solvent was removed under reduced pressure and the red oil was titrated in pentane to yield a brown solid. Yield: 0.280 g, 85%.

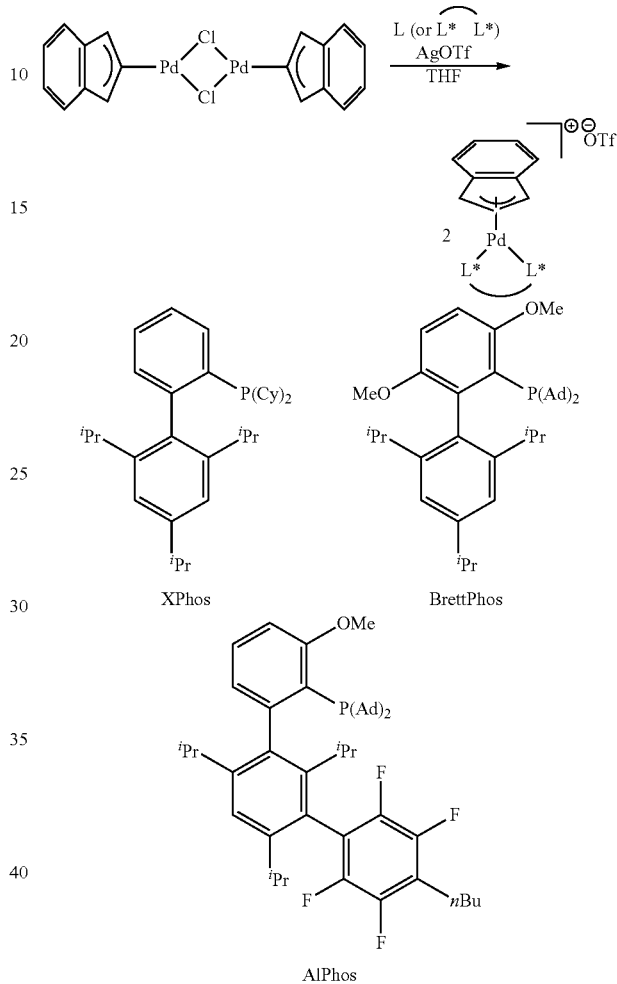

Example 2: Activation of Precatalysts and Isolation of L-Pd(0) Intermediates

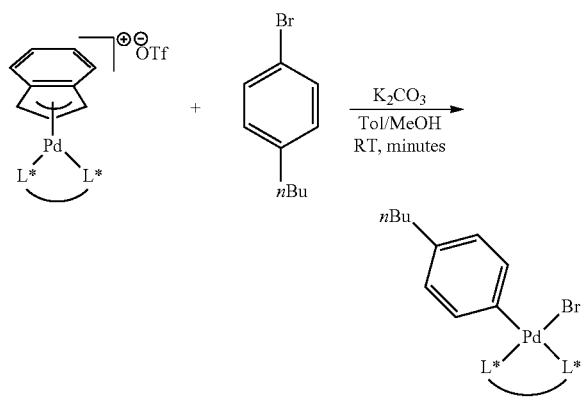

In a 1 dram vial equipped with a flea stir bar, (η³-Indenyl)Pd(L)(OTf) (0.0088 mmol), K₂CO₃ (12.2 mg, 0.088 mmol) and 4-(n-butyl)phenyl bromide (15.5 µL, 0.088 mmol) were added along with toluene-d₈ (0.5 mL) and methanol-d₄ (0.5 mL). This mixture was stirred for 15 minutes at room temperature, at which time it was filtered and the solvents were removed under reduced pressure. The resulting solids were dissolved in toluene-d₈ and a ³¹P spectrum was taken. In each case, the only observed phosphorus-containing species was that of the oxidative addition product, (L)Pd(4-n-butylphenyl)(Br), which matched the spectroscopic values presented in the literature (Lee, et al., 2014, Inorg. Chim. Acta. 422:188-192)

Example 3: Catalytic Activity of (q-Indenyl)Pd(XPhos)(OTf) in a Suzuki-Miyaura Reaction

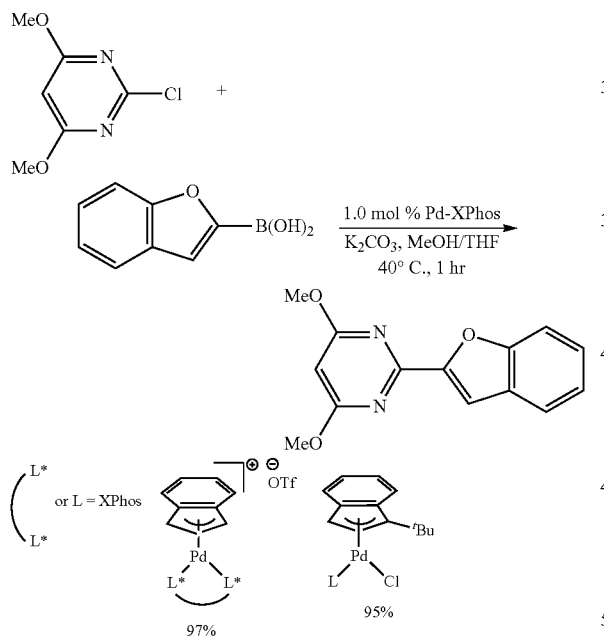

In a dinitrogen filled glove box, 2-chloro-4,6-dimethoxy-pyrimidine (175 µL, 1.0 mmol), benzofuran-2-boronic acid (243 mg, 1.5 mmol), K₂CO₃ (276 mg, 2.0 mmol) and (η³-Indenyl)Pd(XPhos)(OTf) (8.4 mg, 0.01 mmol) were added to a 4 dram vial equipped with a magnetic stir bar. Methanol (4 mL) and THF (2 mL) were added to the vial, which was then sealed and stirred outside of the glove box at 40° C. for one hour. At this point, the vial was opened to air and diethyl ether (10 mL) and H₂O (10 mL) were added to the reaction mixture. The aqueous phase was extracted with diethyl ether (3×10 mL). The combined organic phases were dried over MgSO₄ and filtered. The supernatant was then passed through a pad of silica gel, followed by removal of the solvent under reduced pressure to give the organic product. Yield: 249 mg, 97%.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed:

1. A precatalyst of formula (I), or a salt or solvate thereof:

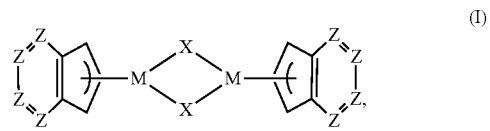

wherein in (I):
 each occurrence of M is independently a transition metal;
 each occurrence of X is a perfluoroalkanesulfonate;
 each occurrence of Z is independently CH or CR; and
 each occurrence of R is independently selected from the group consisting of $C_1$-$C_6$ alkyl, substituted $C_1$-$C_6$ alkyl, $C_3$-$C_8$ cycloalkyl, substituted $C_3$-$C_8$ cycloalkyl, $C_2$-$C_6$ alkenyl, substituted $C_2$-$C_6$ alkenyl, $C_2$-$C_6$ alkynyl, substituted $C_2$-$C_6$ alkynyl, phenyl, substituted phenyl, phenylalkyl, substituted phenylalkyl, aryl, substituted aryl, aryl-$C_1$-$C_6$ alkyl, substituted aryl-$C_1$-$C_6$ alkyl, heteroaryl-$C_1$-$C_6$ alkyl, substituted heteroaryl-$C_1$-$C_6$ alkyl, heteroaryl, and substituted heteroaryl.

2. The precatalyst of claim 1, wherein each occurrence of M is independently selected from the group consisting of Pd, Ni, and Pt.

3. The precatalyst of claim 1, wherein at least one applies:
 (a) the two occurrences of M in (I) are identical; and
 (b) the two ligands comprising 5-membered rings are identical.

4. The precatalyst of claim 1, wherein each occurrence of X is independently selected from the group consisting of triflate, pentafluoroethanesulfonate, heptafluoropropanesulfonate, and nonafluorobutanesulfonate.

5. A precatalyst of formula (II), or a salt or solvate thereof:

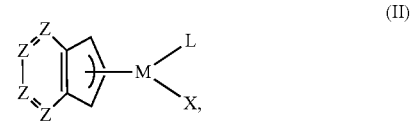

wherein in (II):
 M is a transition metal;
 X is a perfluoroalkanesulfonate;
 each occurrence of Z is independently CH or CR;
 each occurrence of R is independently selected from the group consisting of $C_1$-$C_6$ alkyl, substituted $C_1$-$C_6$ alkyl, $C_3$-$C_8$ cycloalkyl, substituted $C_3$-$C_8$ cycloalkyl, $C_2$-$C_6$ alkenyl, substituted $C_2$-$C_6$ alkenyl, $C_2$-$C_6$ alkynyl, substituted $C_2$-$C_6$ alkynyl, phenyl, substituted phenyl, phenylalkyl, substituted phenylalkyl, aryl, substituted aryl, aryl-$C_1$-$C_6$ alkyl, substituted aryl-$C_1$-$C_6$ alkyl, heteroaryl-$C_1$-$C_6$ alkyl, substituted heteroaryl-$C_1$-$C_6$ alkyl, heteroaryl, and substituted heteroaryl; and L is a monodentate or bidentate ligand,
with the proviso that L is not a monodentate phosphine ligand of formula $PR^*_3$, wherein each occurrence of R* is independently selected from the group consisting of phenyl, cyclohexyl, methyl, and methoxy.

6. The precatalyst of claim 5, which is a compound of formula (IIA), or a salt or solvate thereof:

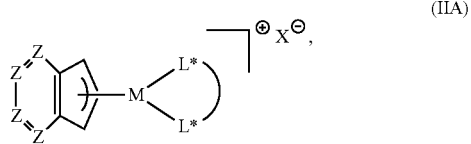

(IIA)

wherein in (IIA):
L is a bidentate ligand represented as

wherein each L* is independently a monodentate ligand group, and
X does not coordinate to M.

7. The precatalyst of claim 5, wherein M is selected from the group consisting of Pd, Ni, and Pt.

8. The precatalyst of claim 5, wherein X is selected from the group consisting of triflate, pentafluoroethanesulfonate, heptafluoropropanesulfonate, and nonafluorobutanesulfonate.

9. The precatalyst of claim 5,
wherein L is selected from the group consisting of 1,3-bis(2,6-diisopropyl phenyl)-1,3-dihydro-2H-imidazol-2-ylidene and 1,3-bis(2,6-bis-(diphenylmethyl)-4-methoxyphenyl) imidazol-2-ylidene, or
wherein L is a bidentate phosphine ligand.

10. The precatalyst of claim 9, wherein L is a bidentate phosphine ligand selected from the group consisting of AmPhos (di-t-butylphosphino-4-dimethylaminobenzene), DavePhos (2-dicyclohexylphosphino-2'-(N,N-dimethylamino) biphenyl), $^{tBu}$DavePhos (2-Di-tert-butylphosphino-2'-(N,N-dimethylamino) biphenyl), QPhos (1,2,3,4,5-pentaphenyl-1'-(di-tert-butylphosphino) ferrocene), RuPhos (2-dicyclohexylphosphino-2',6'-diisopropoxybiphenyl), SPhos (2-dicyclohexylphosphino-2',6'-dimethoxybiphenyl), XPhos (2-dicyclohexyl phosphino-2',4',6'-triisopropylbiphenyl), $^{tBu}$XPhos (2-Di-tert-butylphosphino-2',4',6'-triisopropylbiphenyl), $^{Me4tBu}$XPhos (2-Di-tert-butylphosphino-3,4,5,6-tetramethyl-2',4',6'-triisopropyl-1,1'-biphenyl), BrettPhos (2-(Dicyclohexylphosphino)-3,6-dimethoxy-2',4',6'-triisopropyl-1,1'-biphenyl), $^{tBu}$BrettPhos (2-(Di-tert-butylphosphino)-2',4',6'-triisopropyl-3,6-dimethoxy-1,1'-biphenyl), $^{Ad}$BrettPhos (2-(Diadamantylphosphino)-2',4',6'-triisopropyl-3,6-dimethoxy-1,1'-biphenyl), Me-DalPhos (2-(Di-1-adamantylphosphino) phenylpiperidine), Mor-DalPhos (Di (1-adamantyl)-2-morpholinophenylphosphine), Di(1-adamantyl)-1-piperidinyl-phenylphosphine, RockPhos (2-Di(tert-butyl) phosphino-2',4',6'-triisopropyl-3-methoxy-6-methylbiphenyl), AlPhos (Di-1-adamantyl (4''-butyl-2'', 3'',5'',6''-tetrafluoro-2',4',6'-triisopropyl-2-methoxy-meta-terphenyl)phosphine), PipDalPhos (1-(2-(di((3S,5S,7S)-adamantan-1-yl)phosphanyl)phenyl)piperidine), TrippyPhos (1-[2-[Bis(tert-butyl)phosphino]phenyl]-3,5-diphenyl-1H-pyrazole), BippyPhos (5-(Di-tert-butylphosphino)-1',3',5'-triphenyl-1'H-[1,4']bipyrazole), DPPF (1,1'-bis(diphenylphosphino)ferrocene), XantPhos (4,5-bis(diphenylphosphino)-9,9-dimethylxanthene), NiXantPhos (4,6-bis(diphenylphosphanyl)-10H-phenoxazine), dppe (1,2-bis(diphenylphosphino)ethane), dppm (1,1-bis(diphenylphosphino)methane), dppp (1,3-bis(diphenylphosphino) propane), dppb (1,4-bis(diphenylphosphino)butane), BINAP (2,2'-bis(diphenylphosphino)-1,1'-binaphthyl), DPEPhos (bis [(2-diphenylphosphino) phenyl] ether), 1,2-bis (dichlorophosphino) ethane, and dcpe (1,2-bis (dicyclohexylphosphino)-ethane).

11. A method of preparing the precatalyst of claim 1, the method comprising
contacting a mixed alkaline/transition metal or alkaline-earth/transition metal salt with the ligand

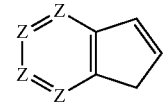

in the presence of a base in an organic solvent to form a reaction mixture;
wherein, if the mixed alkaline/transition metal or alkaline-earth/transition metal salt does not comprise a perfluoroalkanesulfonate salt, the reaction mixture is further contacted with a perfluoroalkanesulfonate salt.

12. The method of claim 11, wherein at least one applies:
(a) the base comprises sodium carbonate;
(b) the organic solvent comprises methanol;
(c) the precatalyst precipitates from the reaction mixture;
(d) the mixed salt comprises $[E]MX'_2$, wherein [E] is $Na_2$, $K_2$, Ca or Mg; and X' is Cl or perfluoroalkanesulfonate;
(e) the mixed alkaline/transition metal salt or a mixed alkaline-earth/transition metal salt is prepared by contacting $MX'_2$ with an alkaline or alkaline-earth salt in solution.

13. A method of preparing the precatalyst of claim 5, the method comprising contacting the catalyst of claim 1 with a ligand L.

14. The method of claim 13, wherein L is at least one selected from the group consisting of an N-heterocyclic carbine (NHC), triphenylphosphine, tri (o-tolyl) phosphine, tricyclohexylphosphine, tri(t-butyl)phosphine, trimethylphosphine, trimethoxyphosphine, $PAd_3$ (Ad=admantyl), trinaphthlphosphine, tri (pentafluorophenyl)phosphine, Diphenyl-2-pyridylphosphine, tri(2-furyl)phosphine, tri(n-octyl)phosphine, dimethylphenylphosphine, AmPhos (di-t-butylphosphino-4-dimethylaminobenzene), DavePhos (2-dicyclohexylphosphino-2'-(N,N-dimethylamino) biphenyl), $^{tBu}$DavePhos (2-Di-tert-butylphosphino-2'-(N,N-dimethylamino) biphenyl), QPhos (1,2,3,4,5-pentaphenyl-1'-(di-tert-butylphosphino)ferrocene), RuPhos (2-dicyclohexylphosphino-2',6'-diisopropoxybiphenyl), SPhos (2-dicyclohexylphosphino-2',6'-dimethoxybiphenyl), XPhos (2-dicyclohexylphosphino-2',4',6'-triisopropylbiphenyl), $^{tBu}$XPhos (2-Di-tert-butylphosphino-2',4',6'-triisopropylbiphenyl), $^{Me4tBu}$XPhos (2-Di-tert-butylphosphino-3,4,5, 6-tetramethyl-2',4',6'-triisopropyl-1,1'-biphenyl), BrettPhos (2-(Dicyclohexylphosphino) 3,6-dimethoxy-2',4',6'-triisopropyl-1,1'-biphenyl), $^{tBu}$BrettPhos (2-(Di-tert-butylphosphino)-2',4',6'-triisopropyl-3,6-dimethoxy-1,1'-biphenyl), $^{Ad}$BrettPhos (2-(Diadamantylphosphino)-2',4',6'-triisopropyl-3,6-dimethoxy-1,1'-biphenyl), Me-DalPhos (2-(Di-1-adamantylphosphino)phenylpiperidine), Mor-DalPhos (Di (1-adamantyl)-2-morpholinophenylphosphine), Di(1-adamantyl)-1-piperidinyl-phenylphosphine, RockPhos (2-Di(tert-butyl)phosphino-2',4',6'-triisopropyl-3-methoxy-6-methylbiphenyl), AlPhos (Di-1-adamantyl (4"-butyl-2", 3",5",6"-tetrafluoro-2',4',6'-triisopropyl-2-methoxy-meta-terphenyl)phosphine), PipDalPhos (1-(2-(di((3S,5S,7S)-adamantan-1-yl)phosphanyl)phenyl)piperidine), TrippyPhos (1-[2-[Bis(tert-butyl)phosphino]phenyl]-3,5-diphenyl-1H-pyrazole), BippyPhos (5-(Di-tert-butylphosphino)-1',3',5'-triphenyl-1'H-[1,4']bipyrazole), DPPF (1,1'-bis(diphenylphosphino)ferrocene), XantPhos (4,5-bis (diphenylphosphino)-9,9-dimethylxanthene), NiXantPhos (4,6-bis(diphenylphosphanyl)-10H-phenoxazine), dppe (1,2-bis(diphenylphosphino)ethane), dppm (1,1-bis(diphenylphosphino)methane), dppp (1,3-bis(diphenylphosphino) propane), dppb (1,4-bis(diphenylphosphino)butane), BINAP (2,2'-bis(diphenylphosphino)-1,1'-binaphthyl), DPEPhos (bis [(2-diphenylphosphino)phenyl] ether), 1,2-bis (dichlorophosphino)ethane, and dcpe (1,2-bis (dicyclohexylphosphino)-ethane).

15. A method of promoting a reaction between a first reagent and a second reagent, the method comprising contacting the first reagent and the second reagent in the presence of at least one selected from the group consisting of
(a) a ligand, and a precatalyst of formula (I), or a salt or solvate thereof:

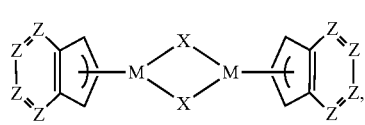
(I)

wherein in (I):
each occurrence of M is independently a transition metal;
each occurrence of X is a non-coordinating or weekly coordinating ligand;
each occurrence of Z is independently CH or CR; and
each occurrence of R is independently selected from the group consisting of $C_1$-$C_6$ alkyl, substituted $C_1$-$C_6$ alkyl, $C_3$-$C_8$ cycloalkyl, substituted $C_3$-$C_8$ cycloalkyl, $C_2$-$C_6$ alkenyl, substituted $C_2$-$C_6$ alkenyl, $C_2$-$C_6$ alkynyl, substituted $C_2$-$C_6$ alkynyl, phenyl, substituted phenyl, phenylalkyl, substituted phenylalkyl, aryl, substituted aryl, aryl-$C_1$-$C_6$ alkyl, substituted aryl-$C_1$-$C_6$ alkyl, heteroaryl-$C_1$-$C_6$ alkyl, substituted heteroaryl-$C_1$-$C_6$ alkyl, heteroaryl, and substituted heteroaryl;
and
(b) a precatalyst of formula (II), or a salt or solvate thereof:

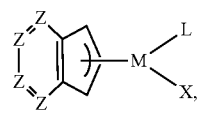
(II)

wherein in (II):
M is a transition metal;
X is a non-coordinating or weekly coordinating ligand;
each occurrence of Z is independently CH or CR;
each occurrence of R is independently selected from the group consisting of $C_1$-$C_6$ alkyl, substituted $C_1$-$C_6$ alkyl, $C_3$-$C_8$ cycloalkyl, substituted $C_3$-$C_8$ cycloalkyl, $C_2$-$C_6$ alkenyl, substituted $C_2$-$C_6$ alkenyl, $C_2$-$C_6$ alkynyl, substituted $C_2$-$C_6$ alkynyl, phenyl, substituted phenyl, phenylalkyl, substituted phenylalkyl, aryl, substituted aryl, aryl-$C_1$-$C_6$ alkyl, substituted aryl-$C_1$-$C_6$ alkyl, heteroaryl-$C_1$-$C_6$ alkyl, substituted heteroaryl-$C_1$-$C_6$ alkyl, heteroaryl, and substituted heteroaryl; and
L is a monodentate or bidentate ligand,
with the proviso that L is not a monodentate phosphine ligand of formula PR*$_3$, wherein each occurrence of R* is independently selected from the group consisting of phenyl, cyclohexyl, methyl, and methoxy.

16. The method of claim 15, wherein each occurrence of X is independently selected from the group consisting of a perfluoroalkanesulfonate, halide, mesylate, tetrafluoroborate, hexafluorophosphate, hexafluoroantimonate, tetraphenylborate, acetate, trifluoroacetate, acetylacetonate, triflimide, and tosylate.

17. The method of claim 15, wherein each occurrence of X is independently selected from the group consisting of triflate, pentafluoroethanesulfonate, heptafluoropropanesulfonate, and nonafluorobutanesulfonate.

18. The method of claim 15, wherein the first reagent and the second reagent are selected from the group consisting of:
(i) the first reagent is an aromatic or heteroaromatic boronic acid or ester, and the second reagent is an aromatic or heteroaromatic halide, tosylate, triflate, mesylate, sulfamate, or carbamate;
(ii) the first reagent is an aromatic or heteroaromatic amine, and the second reagent is an aromatic, heteroaromatic, or vinylic halide, tosylate, triflate, mesylate, sulfamate, or carbamate;
(iii) the first reagent is an aromatic or heteroaromatic zinc halide, and the second reagent is an aromatic, heteroaromatic, or vinylic halide, tosylate, triflate, mesylate, sulfamate, or carbamate;
(iv) the first reagent is an aromatic or heteroaromatic magnesium halide, and the second reagent is an aromatic, heteroaromatic, or vinylic halide, tosylate, triflate, mesylate, sulfamate, or carbamate;
(v) the first reagent is an aromatic or heteroaromatic tin halide, and the second reagent is an aromatic, heteroaromatic, or vinylic halide, tosylate, triflate, mesylate, sulfamate, or carbamate;
(vi) the first reagent is a ketone, aldehyde, imine, amide, or ester, and the second reagent is an aromatic, heteroaromatic, or vinylic halide, tosylate, triflate, mesylate, sulfamate, or carbamate;
(vii) the first reagent is an alcohol or thiol, and the second reagent is an aromatic, heteroaromatic, or vinylic halide, tosylate, triflate, mesylate, sulfamate, or carbamate;
(viii) the first reagent is an aromatic or heteroaromatic silanol, siloxane or silane, and the second reagent is an aromatic, heteroaromatic, or vinylic halide, tosylate, triflate, mesylate, sulfamate, or carbamate.

19. A method of promoting anaerobic oxidation of a primary or secondary alcohol, the method comprising contacting the primary or secondary alcohol with at least one selected from the group consisting of:
  (a) a ligand and a precatalyst of formula (I), or a salt or solvate thereof:

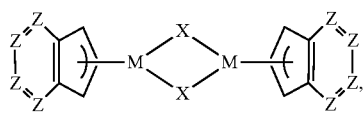

wherein in (I):
    each occurrence of M is independently a transition metal;
    each occurrence of X is a non-coordinating or weekly coordinating ligand;
    each occurrence of Z is independently CH or CR; and
    each occurrence of R is independently selected from the group consisting of $C_1$-$C_6$ alkyl, substituted $C_1$-$C_6$ alkyl, $C_3$-$C_8$ cycloalkyl, substituted $C_3$-$C_8$ cycloalkyl, $C_2$-$C_6$ alkenyl, substituted $C_2$-$C_6$ alkenyl, $C_2$-$C_6$ alkynyl, substituted $C_2$-$C_6$ alkynyl, phenyl, substituted phenyl, phenylalkyl, substituted phenylalkyl, aryl, substituted aryl, aryl-$C_1$-$C_6$ alkyl, substituted aryl-$C_1$-$C_6$ alkyl, heteroaryl-$C_1$-$C_6$ alkyl, substituted heteroaryl-$C_1$-$C_6$ alkyl, heteroaryl, and substituted heteroaryl; and
  (b) a precatalyst of formula (II), or a salt or solvate thereof:

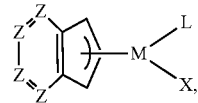

wherein in (II):
    M is a transition metal;
    X is a non-coordinating or weekly coordinating ligand;
    each occurrence of Z is independently CH or CR;
    each occurrence of R is independently selected from the group consisting of $C_1$-$C_6$ alkyl, substituted $C_1$-$C_6$ alkyl, $C_3$-$C_8$ cycloalkyl, substituted $C_3$-$C_8$ cycloalkyl, $C_2$-$C_6$ alkenyl, substituted $C_2$-$C_6$ alkenyl, $C_2$-$C_6$ alkynyl, substituted $C_2$-$C_6$ alkynyl, phenyl, substituted phenyl, phenylalkyl, substituted phenylalkyl, aryl, substituted aryl, aryl-$C_1$-$C_6$ alkyl, substituted aryl-$C_1$-$C_6$ alkyl, heteroaryl-$C_1$-$C_6$ alkyl, substituted heteroaryl-$C_1$-$C_6$ alkyl, heteroaryl, and substituted heteroaryl; and
    L is a monodentate or bidentate ligand,
      with the proviso that L is not a monodentate phosphine ligand of formula $PR^*_3$, wherein each occurrence of $R^*$ is independently selected from the the group consisting of phenyl, cyclohexyl, methyl, and methoxy.

20. The method of claim 19, wherein each occurrence of X is independently selected from the group consisting of a perfluoroalkanesulfonate, halide, mesylate, tetrafluoroborate, hexafluorophosphate, hexafluoroantimonate, tetraphenylborate, acetate, trifluoroacetate, acetylacetonate, triflimide, and tosylate.

21. The method of claim 19, wherein each occurrence of X is independently selected from the group consisting of triflate, pentafluoroethanesulfonate, heptafluoropropanesulfonate, and nonafluorobutanesulfonate.

* * * * *